United States Patent
Kim et al.

(10) Patent No.: US 10,692,469 B2
(45) Date of Patent: Jun. 23, 2020

(54) TOUCH RECOGNITION ENABLED DISPLAY DEVICE WITH ASYMMETRIC BLACK MATRIX PATTERN

(71) Applicant: LG Display Co., Ltd., Seoul (KR)

(72) Inventors: Mingyeong Kim, Paju-si (KR);
Taesang Kim, Cheonan-si (KR);
Seongsu Kim, Jeollabuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/102,220

(22) Filed: Aug. 13, 2018

(65) Prior Publication Data

US 2019/0005923 A1    Jan. 3, 2019

Related U.S. Application Data

(62) Division of application No. 14/701,378, filed on Apr. 30, 2015, now Pat. No. 10,074,344.

(51) Int. Cl.
| | | |
|---|---|---|
| *G09G 5/18* | (2006.01) | |
| *G06F 3/044* | (2006.01) | |
| *G06F 3/041* | (2006.01) | |
| *G09G 3/20* | (2006.01) | |

(52) U.S. Cl.
CPC ............. *G09G 5/18* (2013.01); *G06F 3/044* (2013.01); *G06F 3/0412* (2013.01); *G06F 3/0416* (2013.01); *G09G 3/20* (2013.01); *G09G 2300/023* (2013.01); *G09G 2300/0426* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,772,708 B2 * | 9/2017 | Kim | G06F 3/0412 |
| 2008/0018613 A1 | 1/2008 | Kim et al. | |
| 2008/0204377 A1 * | 8/2008 | Kajiyama | G09G 3/3225 345/76 |
| 2011/0227850 A1 | 9/2011 | Oh et al. | |
| 2011/0228188 A1 * | 9/2011 | Kim | G02F 1/13338 349/43 |
| 2013/0141348 A1 * | 6/2013 | Jamshidi-Roudbari | G06F 3/0412 345/173 |
| 2016/0320882 A1 * | 11/2016 | Kim | G06F 3/044 |
| 2017/0045984 A1 * | 2/2017 | Lu | G06F 3/044 |
| 2017/0060317 A1 * | 3/2017 | Kim | G06F 3/0416 |

(Continued)

OTHER PUBLICATIONS

United States Office Action, U.S. Appl. No. 14/701,378, dated Jan. 18, 2018, 13 pages.

*Primary Examiner* — Amare Mengistu
*Assistant Examiner* — Sarvesh J Nadkarni
(74) *Attorney, Agent, or Firm* — Fenwick & West LLP

(57) ABSTRACT

A touch recognition enabled display device includes a plurality of common electrode blocks serving as touch-sensing regions and/or touch-driving regions. Conductive lines connected to the common electrode blocks are placed under the common electrode blocks and the pixel electrodes of the pixels, and they are routed across the active area, directly toward an inactive area where drive-integrated circuits are located. The conductive lines are positioned under one or more planarization layers, and are connected to the corresponding common electrode blocks via one or more contact holes.

20 Claims, 12 Drawing Sheets

(56) References Cited

U.S. PATENT DOCUMENTS

2017/0185193 A1\* 6/2017 Kim .................. H01L 27/323
2017/0185194 A1\* 6/2017 Kim .................. G06F 3/0412
2017/0185195 A1\* 6/2017 Kim .................. G06F 3/0412
2017/0192580 A1\* 7/2017 Jung .................. G06F 3/0416

\* cited by examiner

TOUCH RECOGNITION ENABLED DISPLAY DEVICE WITH ASYMMETRIC BLACK MATRIX PATTERN

CROSS-REFERENCE TO RELATED APPLICATIONS

This application is a divisional of U.S. patent application Ser. No. 14/701,378, filed on Apr. 30, 2015, which is hereby incorporated by reference in its entirety.

BACKGROUND OF THE INVENTION

Field of the Invention

The present disclosure generally relates to a display device, and more particularly to a display device configured for advanced capacitance touch-sensing and a method for manufacturing the same.

Description of the Related Art

With ease of use and versatility in operation, touch sensor has been one of the most popular user interaction mechanisms in a variety of electronic devices. In particular, a touch screen allows a user to interact with a device simply by touching the graphical interface displayed on the screen with fingers, stylus or other objects. Thus, the touch screen is applied in various kinds of flat panel displays such as liquid crystal displays (LCDs) and organic light emitting diode (OLED) displays.

Conventionally, a substrate provided with a matrix of touch-driving lines and touch-sensing lines is overlaid across a display panel to provide the touch-sensing functionality. However, placing a separate substrate for sensing touch inputs on the display panel adds to the thickness and the weight of the display device. As such, attempts have been made to integrate components of the touch sensor within the stacks of layers forming the display panel. Integrating the touch sensor components within the display panel, however, often necessitates some compromises to be made in the display qualities. For instance, conductive lines transmitting signals to and from the display regions in the display panel for an implementation of touch-sensing mechanism may generate unwanted parasitic capacitance with other components of the display panel, which may lead to visual defects (e.g., irregular tilting angle of LCD molecules, line dim, etc.).

SUMMARY

The present disclosure generally relates to display devices provided with touch-sensing functionality, and more particularly, to configurations for implementing a touch sensor within a display panel with minimal visual defects caused by the touch sensor.

In a display device, some elements used in relation with a display functionality can be configured to recognize touch inputs on the screen. For instance, some integrated circuits (ICs) may be configured to provide signals for operating the display pixels and for sensing the touch inputs. Similarly, an electrode and/or a conductive layer of a storage capacitor in display pixels used in displaying image from the display panel can be configured to serve as a part of a touch sensor. In this way, display devices can be manufactured using fewer parts and/or manufacturing steps, and may have lighter weight with thinner profile. Such configurations can also eliminate or otherwise reduce various undesired side effects, which may result from placing discrete touch sensor components in the display panel.

When implementing a touch sensor within a display panel, fine-tuning of the touch-sensing functionality and the display functionality can be challenging. Among various types of LCD display panels, arrangement of the components for both functionalities can be especially challenging for the in-plane-switching (IPS) type and the fringe-field-switching (FFS) type LCD display panels as the electrodes for generating fields that controls the orientation of the liquid crystal molecules are provided on the same side of the liquid crystal layer.

Accordingly, a touch recognition enabled display is provided with a plurality of pixel groups. The pixels included in each pixel group are configured share a transparent electrode. Further included in the touch recognition enabled display is a plurality of common signal lines CS_LNs. Each common signal line CS_LN is connected to the transparent electrode of one of the pixel groups, and configured to transmit touch control signals to and from a touch drive integrated circuit and the transparent electrode connected thereto. The common signal lines CS_LNs are covered by a lower planarization layer PLN-L. The lower planarization layer PLN-L is coated over the common signal lines CS_LNs in a thickness sufficient to provide a planar surface over the plurality of common signal lines CS_LNs. In this regard, the thickness of the lower planarization layer PLN-L should be greater than the thickness of the common signal lines CS_LNs. As such, the material of the lower planarization layer PLN-L should be adaptable to coating methods suitable for creating planar surface over the common signal lines CS_LNs thereunder. On the planar surface provided by the lower planarization layer PLN-L, an array of thin-film-transistors is formed. Thus, the lower planarization layer PLN-L is formed of a material with a sufficient thermal stability so that it can withstand the processes involved in forming other components, such as an array of thin-film-transistors, and maintain the planar surface. As such, the lower planarization layer PLN-L may be an inorganic material, for example a silicon-based material. The array of TFTs is covered with an upper planarization layer PLN-U. In some embodiments, the transparent electrode of each of the pixel groups can be formed on the upper planarization layer PLN-U.

One or more passivation layers may be provided between the lower planarization layer PLN-L and the array of TFTs. The passivation layer may provide some protection against undesired fumes (e.g., hydrogen fumes) from the lower planarization layer PLN-L for components that are placed on the lower planarization layer PLN-L. The passivation layer may be a silicon nitride layer, a silicon oxide layer or stacks of such layers. The material and configuration of the passivation layer between the lower planarization layer PLN-L and the array of TFT can vary depending on the semiconductor layer (i.e., active layer) of the TFTs in the array. For instance, at least some of the TFTs provided on the lower planarization layer PLN-L may include the oxide metal semiconductor layer such as indium-gallium-zinc oxide, and a silicon nitride layer can be interposed between the lower planarization layer PLN-L and the TFTs formed thereon.

The plurality of common signal lines CS_LNs are arranged parallel to one another, and the plurality of common signal lines CS_LNs may be arranged either in a row direction or in a column direction. In some embodiments, the common signal lines CS_LNs may be arranged in the same orientation as the data lines. In such embodiments, each one of the common signal lines CS_LNs may be arranged underneath one of the corresponding data lines. In alternate embodiments, the common signal lines CS_LNs may be routed in the same direction as the gate lines. In such embodiments, each one of the common signal lines CS_LNs may be arranged underneath ones of the respective gate lines.

Within the display area, each of the common signal lines CS_LNs is connected to a transparent electrode of one of the pixel groups. That is, the common signal line CS_LN is not connected to the transparent electrodes of different pixel groups in the display area. Since the common signal lines CS_LNs are provided under the array of TFTs, common signal lines CS_LNs can be routed across a transparent electrode of another the pixel group without being connected thereto.

In some embodiments, the transparent electrodes of the pixel groups may be configured to provide a self-capacitance touch recognition system. In this configuration, each common signal line CS_LN connected to a transparent electrode of one of the pixel group is routed across a transparent electrode of another pixel group, such that each of the transparent electrodes is individually controlled by the touch drive integrated circuit.

In some other embodiments, the transparent electrodes can be configured to provide a mutual-capacitance touch recognition system. In this configuration, each common signal line CS_LN connected to a transparent electrode of one of the pixel group is routed across a transparent electrode of another pixel group, and the common signal lines CS_LNs can be selectively grouped in the non-display area to control the transparent electrodes in selective groups, which may serve as touch driving region and touch sensing region of the mutual-capacitance touch recognition system.

The connection between the common signal line CS_LN and the corresponding transparent electrode of a pixel group may be provided by a bypass line BP_LN, which is provided in another layer from the common signal line CS_LN and the transparent electrode. In some embodiments, each of the common signal lines CS_LNs is connected to at least one of the bypass lines BP_LNs via a first contact hole (i.e., lower contact hole CNT-L) through the lower planarization layer PLN-L. This bypass line BP_LN is connected to the transparent electrode of the corresponding the pixel group via a second contact hole (i.e., upper contact hole CNT-U) through the upper planarization layer PLN-U covering the array of the TFTs.

When the connection between the common signal line CS_LN and the transparent electrode is made via the bypass line BP_LN, each of the pixel groups include a plurality of normal pixels and a plurality of bypass pixels. The normal pixels are the pixels of which the aperture ratio is not reduced by the bypass lines BP_LNs. In other words, the normal pixels are the pixels without any part of the bypass lines BP_LNs extending therein. On the other hand, the aperture ratio of the bypass pixels is reduced by the bypass lines BP_LNs. More specifically, at least some part of the bypass lines BP_LNs is located in the bypass pixels. Each bypass line BP_LN extends from the contact region corresponding to the lower contact hole CNT-L to the contact region corresponding to the upper contact hole CNT-U. Accordingly, each bypass line BP_LN extends across a set of consecutively arrange bypass pixels from a first bypass pixel, which accommodates the lower contact hole CNT-L, to a second bypass pixel, which accommodates the upper contact hole CNT-U.

In some embodiments, multiple bypass lines BP_LNs are used to connect a single common signal line CS_LN to a transparent electrode of one of the pixel groups. In some embodiments, multiple common signal lines CS_LNs can be used to connect each individual transparent electrode to the touch drive integrated circuit. As such, each pixel group may include multiple sets of bypass pixels, each set including the bypass pixels consecutively arranged from the pixel with the lower contact hole CNT-L to the pixel with the upper contact hole CNT-U of the respective bypass line BP_LN.

In some embodiments, the common signal lines CS_LNs may be provided in a first metal layer, the bypass lines BP_LNs may be provided in a second metal layer along with the gate lines, and the data lines may be provided in a third metal layer along with the source/drain electrodes of the TFTs.

In some embodiments, the TFTs in the array may have the bottom gate structure in which the gate is provided under the semiconductor layer.

In some embodiments, the touch recognition enabled display further comprises a masking layer BM that is capable of blocking light from passing through. The masking layer BM includes a plurality of strips, in which each strip is arranged on one of the data lines (i.e., a data BM strip). Each data BM strip is arranged to overlap the data line between two adjacent columns (or two adjacent rows depending the orientation of the data lines) of pixels across the display area. Each data BM strip includes a plurality of data BM segments. Each data BM segment is the portion of the data BM strip between one pixel from a column of pixels on one side of the data BM strip and adjacent pixel from a column (or row) on the opposite side of the data BM strip.

In some embodiments, touch recognition enabled display further comprises a color filter layer, and the masking layer BM is provided closer to the array of the TFTs than the color filter layer.

In some embodiments, the color filter layer and the masking layer BM may be provided on a second substrate, which is different from the first substrate where the array of TFT is located. Here, the color filter layer may be arranged such that the masking layer BM is provided further away from the first substrate than the color filter layer. Alternatively, the color filter layer and the masking layer BM may be provided on a second substrate, and arranged such that the masking layer BM is provided closer toward the first substrate where the array of TFTs is provided than the color filter layer. The light from the display can be projected from the first substrate and extracted toward the second substrate, and the masking layer BM positioned closer toward the first substrate then the color filter layer can help in suppressing light intended for one pixel leaking into an adjacent pixel.

In order to reduce the aperture ratio discrepancy among the pixels, some of the segments in a data BM strip can be asymmetrically arranged from other segments of the same data BM strip. To this end, in some embodiments, the data BM segments between two immediately adjacent normal pixels may be provided with a greater width than the data BM segments positioned next to the first bypass pixel with the lower contact hole CNT-L, the second bypass pixel with the upper contact hole CNT-U or any intermediate bypass pixels between the first bypass pixel and the second bypass pixel. That is, in each of the data BM strips, data BM segments positioned next to a first bypass pixel, a second bypass pixel or any intermediate bypass pixels between the first bypass pixel and the second bypass pixel is narrower than other data BM segments positioned at between two immediately adjacent normal pixels.

In some embodiments, the data BM segments that are neighboring the first bypass pixel, the second bypass pixel or any intermediate pixels between the first bypass pixel and the second bypass pixel may have substantially the same width, which is narrower than a width of data BM segments positioned between two immediately adjacent normal pixels.

In some embodiments, the data BM segments neighboring the first bypass pixel or the second bypass pixel is asymmetrically configured with respect to other segments of the data BM strips, such that a distance in which the data BM segment overhangs beyond an edge of the data line thereunder in a direction toward the first bypass pixel or the second bypass pixel is shorter than a distance that the data BM segment overhangs beyond the edge of the respective data line in the opposite direction.

In some embodiments, the data BM segments between a normal pixel and any one of the first bypass pixel or the second bypass pixel is asymmetrically configured such that edge of the data BM segment facing the bypass pixel accommodating either one of the contact holes are substantially aligned with an edge of the corresponding data lines facing the same direction, whereas an opposite edge of the data BM segment facing the normal pixel is extended further out toward the normal pixel than an opposite edge of the corresponding data lines facing the same direction.

In some embodiments, the first bypass pixel and the second bypass pixel may be positioned immediately adjacent to each other. For instance, the first bypass pixel that accommodates a lower contact hole CNT-L for one of the bypass lines BP_LNs may be positioned immediately next to a second bypass pixel that accommodates an upper contact hole CNT-U for another one of the bypass lines BP_LNs. In such cases, a data BM segment can be positioned between two immediately adjacent pixels that one includes the lower contact hole CNT-L and the other includes the upper contact hole CNT-U, and such data BM segment can be configured such that the data BM overhangs on both outside edges of the underneath data line in the same distance.

In some embodiments, the data BM segment between the first bypass pixel and an intermediate bypass pixel between the first bypass pixel and the second bypass pixel is asymmetrically configured such that a distance in which the data BM segment overhangs outside the edge of the data line thereunder toward the first bypass pixel is shorter than a distance in which the respective data BM segment overhangs outside the edge of the respective data line toward the intermediate bypass pixel.

In some embodiments, the first bypass pixel and the second bypass pixel are two adjacent blue pixels in the same pixel group. In some embodiments, the first bypass pixel and the second bypass pixel are two adjacent blue pixels in the same pixel group, and at least one intermediate bypass pixel is provided between the first bypass pixel and the second bypass pixel.

In the embodiments disclosed in the present disclosure, the common signal lines CS_LNs are arranged under the array of TFTs and routed underneath the data lines or the gate lines. Since the common signal lines CS_LNs are routed directly across the active area towards the inactive area, the size of the inactive area at the side of the panel can be reduced. Such configuration also allows reducing the distance between the electrodes that configures the storage capacitor of the pixels. In case of LCD displays, placing the common signal lines CS_LNs away from the layers of the common electrode and the pixel electrode allows to reduce the thickness of the passivation layer between them. Since, the common signal lines CS_LNs can be spaced farther away from the common electrode blocks, they can be provided with a desired thickness to decrease RC delays during touch-sensing period. In addition, undesired fringe field between the pixel electrode PXL and the common signal lines CS_LNs can be kept to minimal when the common electrode blocks arranged in the layer between them. This effectively solves the light leakage problem caused by having the common signal lines CS_LNs in the same layer as the pixel electrode PXL.

In addition, the masking layer BM is provided with asymmetrically configured masking strips configured to compensate the aperture ratio discrepancy between the pixels caused by the bypass line BP_LN for connecting the common signal lines CS_LNs to the transparent electrode. Within each masking strip, narrower segments (i.e., portions) are provided next to the pixels with reduced aperture ratio due to the bypass lines BP_LNs than the segments positioned between the pixels with the full aperture ratio (i.e., pixels in which the aperture ratio is not directly reduced by the bypass line BP_LN). In this way, the aperture ratio of the bypass pixels (i.e., pixels in which the aperture ratio is reduced by the bypass line BP_LN) is increased while the aperture ratio of the normal pixels is reduced down. Also, the segments, which are positioned next to the bypass pixels with the contact holes for connecting the bypass lines BP_LNs to the corresponding common signal lines CS_LNs and the transparent electrodes, can be shifted in the direction away from the pixels with the contact hole to maximize the aperture ratio of those pixels with the contact hole. Accordingly, the difference in the aperture ratio between the bypass pixels and the normal pixels can be reduced to minimize any visual defects such as moirés.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

The following description includes embodiments described in the context of LCDs, in particular the In-Plane-Switching (IPS) mode LCD and the Fringe-Field-Switching (FFS) mode LCD, in which the common electrodes and the pixel electrodes of the pixels are arranged on one of the substrates that enclose the liquid crystal layer. However, it should be appreciated that the features described here can be used applied to any types of displays having a plurality of conductive lines placed under the array of TFTs, which are connected to the ones of the electrodes shared among a group of pixels. For instance, an organic-light-emitting-diode (OLED) display can be provided with the common signal lines CS_LNs placed under the TFT array, and each of the common signal lines CS_LNs can be connected to an electrode shared among a group of pixels to provide touch recognition functionality. Moreover, the configuration described herein may be used to provide various other types of functionalities in the display device, for example touch-pressure sensing functionality or tactile feedback functionality.

Example embodiments may be described herein with reference to a Cartesian coordinate system in which the x-direction and the y-direction can be equated to the horizontal (row) direction and the vertical (column) direction, respectively. However, one skilled in the art will understand that reference to a particular coordinate system is simply for the purpose of clarity, and does not limit the direction of the structures to a particular direction or a particular coordinate system.

Furthermore, although specific materials and types of materials may be included in the descriptions of example embodiments, one skilled in the art will understand that other materials that achieve the same function can be used. For example, it should be understood that a "conductive layer" as described in the examples below can be a layer and a stack of layers formed of any electrically conductive material such as a metal, a carbon based material, a composite conductive material and the like.

Figure 1:
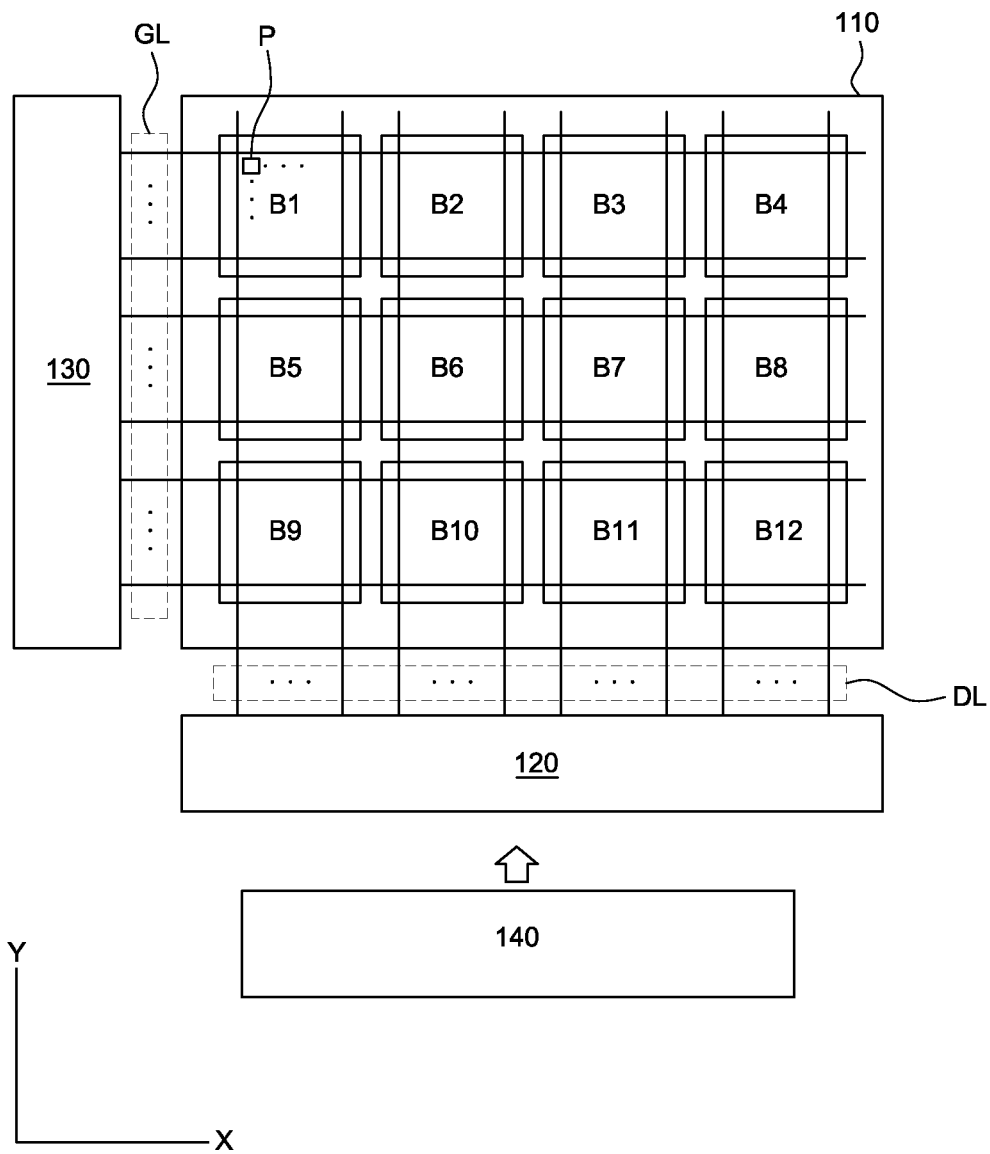
FIG. 1 illustrates an exemplary touch sensor integrated display according to an embodiment of the disclosure.

FIG. 1 schematically illustrates a configuration of a display device 100 with an integrated touch screen according to an embodiment of the present invention. Referring to FIG. 1, the touch recognition enabled display device 100 includes a substrate 110 provided with a plurality of pixels that are connected to the data lines DL and the gate lines GL. In the area outside the active area, which may be referred to as the inactive area, a data drive integrated circuit 120 and a gate drive integrated circuit 130 are configured to provide data signals and the gate signals to the data lines DL and the gate lines GL, respectively. The data-drive IC 120 and the gate-drive IC 130 transmits various display control signals, for example, a gate signal, a common voltage signal and a data signal, to operate display pixels in the active area.

Each of the pixels "P" includes a thin-film-transistor (TFT) with a gate, a source and a drain. Each pixel also includes a capacitor that is formed with a pixel electrode and a common electrode. The gate of the TFT is connected to a gate line GL, the source of the TFT is connected to the data line DL and the drain of the TFT is connected to the pixel electrode of the respective pixel.

At least some elements of a touch sensor are integrated in an active area of the substrate 110 where the pixels of the display device 100 are located. That is, the pixels include capacitive elements or electrodes, that can operate to carry out the display functionality and that can also operate to carry out the touch-sensing functionality.

In the display device depicted in FIG. 1, a common electrode used for controlling the liquid crystal molecules of the pixels is provided as a plurality of common electrode blocks (B1-B12). The touch drive integrated circuit 140 is configured to provide touch-sensing related signals to each of the common electrode blocks so that they can be used in sensing touch inputs on the display device 100. It should be appreciated that other transparent electrode provided in the display device may be divided into a plurality of blocks and configured to receive touch-sensing related signals from the touch drive-IC 140 via the common signal lines CS_LNs. Similarly, a plurality of transparent electrode provided in an organic-light-emitting diode (OLED) display device may be configured to receive touch-sensing related signals from the touch drive-IC 140 via the common signal lines CS_LNs.

The touch-drive IC 140 may be configured to transmit and receive various touch sense functionality related signals (i.e., touch control signals) to and from the data-drive IC 120. In some embodiments, all of the data-drive IC 120, the gate-drive IC 130 and the touch-drive IC 140 may be provided on the substrate 110. In some other embodiments, some of the drive ICs may be provided on a separate printed circuit board connected to the substrate 110. Although the data-drive IC 120, the gate-drive IC 130 and the touch-drive IC 140 are illustrated as discrete components in the display device 100, some or all of these drive ICs may be integrated with one another as a single component. For instance, the data drive IC 130 and the touch-drive IC 140 may be provided on the same printed circuit board, which is connected to the substrate 110. Also, the touch-drive IC 140 may be provided as a part of the data drive IC 130. The signals from the display-drive IC 120 and the touch-drive IC 140 are provided to the common electrode blocks via a plurality of common signal lines CS_LNs.

Figure 2A:
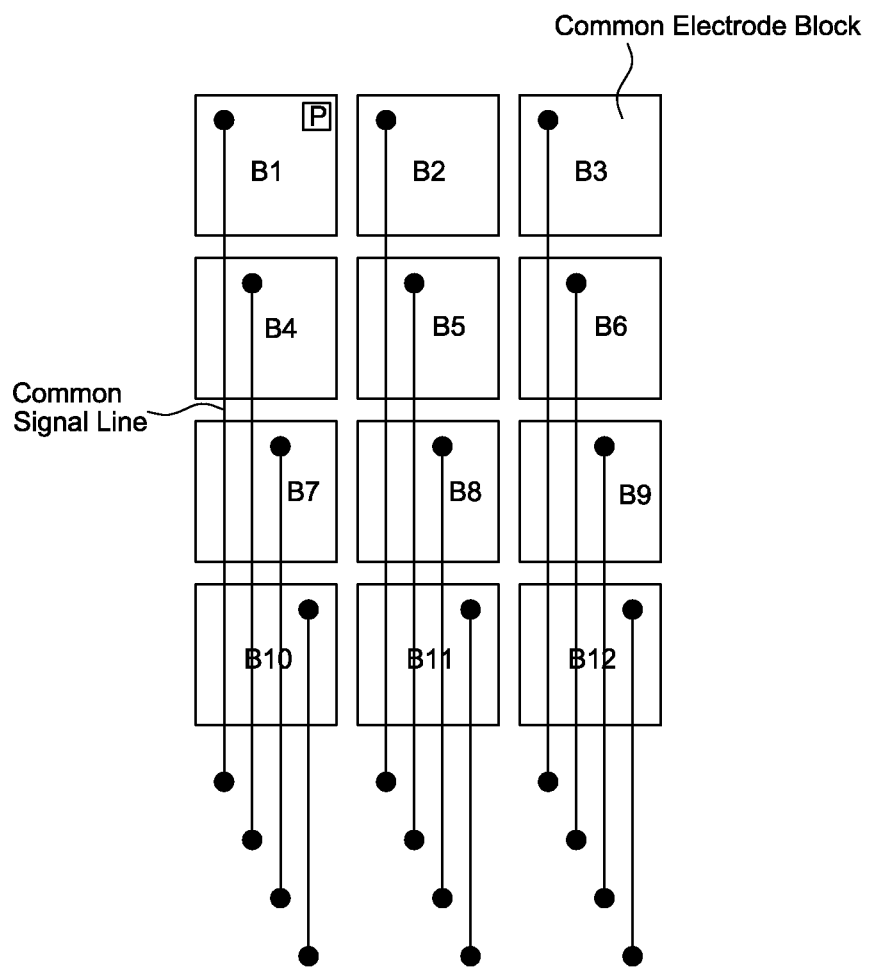
FIG. 2A is a schematic illustration of the transparent electrode (e.g., common electrode blocks) and the common signal lines CS_LNs in an exemplary touch recognition enabled display device that is configured to operate in the self-capacitance mode, according to an embodiment of the disclosure.
Figure 2B:
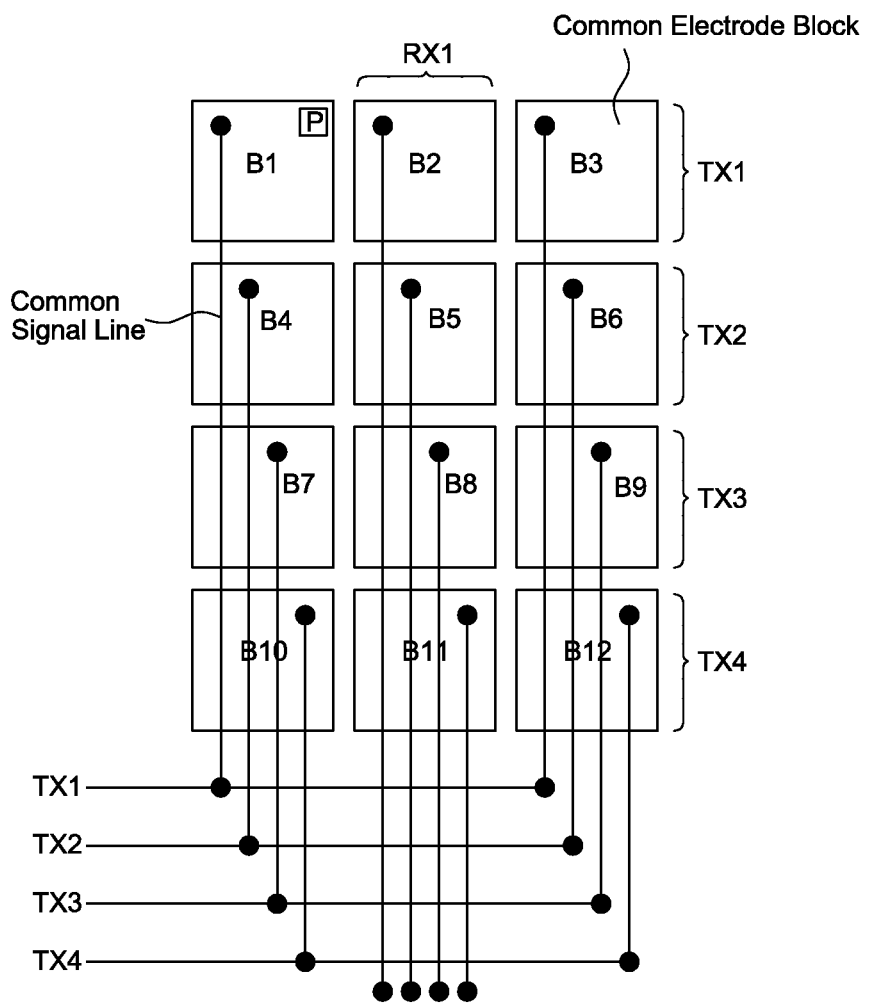
FIG. 2B is a schematic illustration of the transparent electrode (e.g., common electrode blocks) and the common signal lines CS_LNs in an exemplary touch recognition enabled display device that is configured to operate in the mutual-capacitance mode, according to an embodiment of the disclosure.

FIGS. 2A and 2B illustrate exemplary configurations of the transparent electrode blocks (e.g., common electrode blocks) and the common signal lines CS_LNs. In particular, FIG. 2A illustrates an exemplary configuration of common electrode blocks and the common signal lines CS_LNs for a self-capacitance touch recognition system. In the self-capacitance touch recognition system, each common electrode blocks function as a touch sense electrode with a unique coordinate, and thus the change in the capacitance on each of the common electrode blocks can be used to detect the location of the touch inputs on the display device 100. To achieve this, each common electrode block is configured to communicate with the display-drive IC 120 and the touch-drive IC 140 separately from other common electrode blocks by using an independent common signal line CS_LN.

FIG. 2B illustrates an exemplary configuration of common electrode blocks and the common signal lines CS_LNs for a mutual-capacitance touch recognition system. In a mutual-capacitance touch recognition system, the common electrode blocks are selectively grouped together so that some groups of common electrode blocks serve as touch-driving electrodes and some other groups of common electrode blocks serve as touch-sensing electrodes. Unlike the self-capacitance touch recognition system, the mutual-capacitance touch recognition system relies on the changes in capacitance between a pair of touch-driving electrode and a touch-sensing electrode to detect the location of the touch inputs on the display device 100. To achieve this, sets of common signal lines CS_LNs can be grouped together such that each group of common electrode blocks arranged in one direction (e.g., X-direction) collectively forms a touch-driving line (TX line), and each group of common electrode blocks arranged in another direction (e.g., Y-direction) collectively forms a touch-sensing line (RX line).

For example, the common signal lines CS_LNs from the common electrode blocks B1 and B3 are grouped together as illustrated in FIG. 2B, so that the first touch-driving line TX1 is formed in X-direction. Similarly, the common signal lines CS_LNs from the common electrode blocks B4 and B6, the common electrode blocks B7 and B9, and the common electrode blocks B10 and B12 are grouped together to form touch-driving lines TX2, TX3 and TX4, respectively. The touch-sensing line RX is formed in Y-direction by grouping the common signal lines CS_LNs from the common electrode blocks B2, B5, B8 and B11. The TX lines TX1-TX4 run parallel to the gate lines GL, and the touch-sensing line RX runs parallel to the data lines DL. In this way, a mutual capacitance is formed at intersections between the TX lines and the Rx line. As shown in FIG. 2B, the common signal lines CS_LNs connected to the corresponding ones of the common electrode blocks are routed directly across the active area, and they are grouped together to form either the TX lines or the RX lines.

For sake of simplicity, only 12 common electrode blocks are used to implement the touch-sensing regions in the display device 100 in the examples in FIGS. 2A and 2B. However, it should be understood that the number of common electrode blocks is not limited as such, and the common electrode of the display device can be divided into additional number of common electrode blocks. Also, it should be noted that the size of individual pixels may be much smaller than the size of an individual unit of touch sense region to be provided in the display device 100. Accordingly, the size of each common electrode block can be larger than the size of the pixel. In other words, a single common electrode block can be shared by several pixels, even though each of those pixels is provided with an individual pixel electrode.

Figure 3:
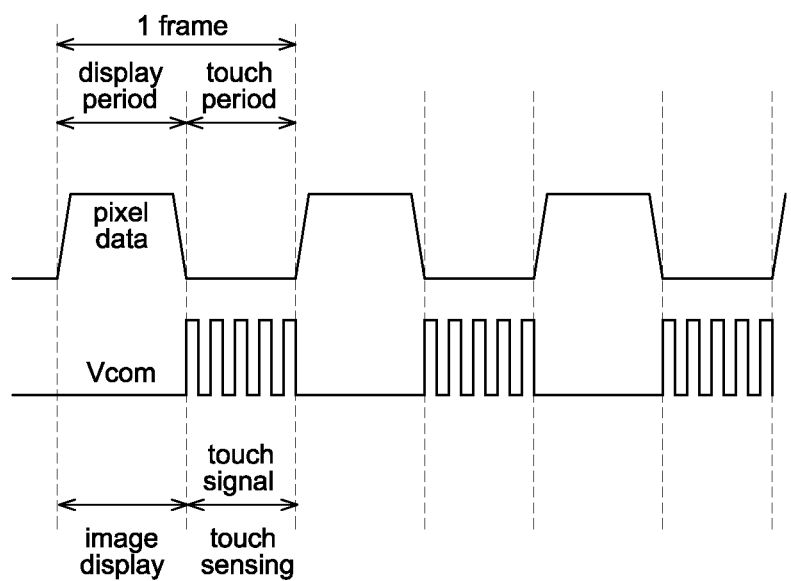
FIG. 3 illustrates exemplary signals applied to the common electrode blocks of the pixels during a display period and during a touch sense period according to embodiments of the disclosure.

FIG. 3 shows example signals applied through the common signal lines CS_LNs to the common electrode blocks during a display period and during a touch-sensing period. Since the common electrode blocks are also used as the touch electrode, they are provided with signals related to display functionality for a certain period and provided with signals related to touch recognition functionality for a certain period. That is, one frame period, which is defined by the vertical sync signal, is divided into a display period and a touch-sensing period.

The display period can only take a portion of one frame period. That is, the pixels of the display device 100 may be refreshed with a new frame of image data in every predetermined period of time. However, the time in which the gate signals and the data signals are provided on the gate lines and the data lines for charging the pixels with new image data may be shorter than the predetermined refreshing period. The period remaining before charging the pixels with a new frame of data can be used for preparing the pixels to receive new image data and for recognition of touch inputs on the screen. For instance, each frame can be 16.6 ms, in which about 12 ms is dedicated for the display period. The rest is used for carrying out the touch-sensing functionality and for preparing the pixels to receive a new frame of image data.

As mentioned, the common voltage signal is transmitted from the data-drive IC 120 to the common electrode blocks via the common signal lines CS_LNs during the display period. The common voltage signal may be in the form of a pulse signal that swings between a positive voltage and a negative voltage to perform LCD inversion.

In the touch period, the touch-driving signal is transmitted from the touch-drive IC 140 to at least some of the common electrode blocks via the common signal lines CS_LNs. In cases where the common electrode blocks are configured as the self-capacitance touch recognition system, each of the common electrode blocks are provided with touch-driving pulses, and the signals from each of the common electrode blocks are analyzed to determine whether a touch input was registered on a particular common electrode block. More specifically, in the self-capacitive touch recognition system, charging or discharging of the touch-driving pulse on the common electrode blocks can be used to determine touch inputs on the common electrode blocks. For example, a change in the capacitance value upon a touch input changes the time in which the voltage slope on the common electrode block. Such a change on each of the common electrode blocks can be analyzed to determine the location of touch input on the display device 100.

In cases where the common electrode blocks are configured as the mutual-capacitance touch recognition system, groups of common electrode blocks that are configured as the touch-driving lines (TX) are provided with the touch-driving pulses, and groups of common electrode blocks that are configured as the touch-sensing lines (RX) are provided with a touch reference voltage signal. The presence of a touch input is detected based on a change in the charge of the RX lines.

In the example shown in FIG. 2B, each of the TX lines was defined by a group of common electrode blocks arranged in a row (X-direction), and each of the RX lines was defined by a group of common electrode blocks arranged in a column (Y-direction). However, the arrangement of the common electrode blocks is not limited as such, and may be arranged in a various other ways depending on the desired layout of the TX and RX lines in the display device 100. The number of TX lines implemented with the common electrode blocks arranged in a single row as well as the number of RX lines implemented with the common electrode blocks arranged in a single column can vary depending on various factors. For instance, the common electrode blocks arranged in a single row can be used to provide multiple TX lines, and the common electrode blocks arranged in a single column can be used to provide multiple RX lines based on the touch scanning frequency and the accuracy as well as the size of the display device 100.

Also, the RX line in the mutual-capacitance touch recognition system can be formed with a common electrode block that is larger than the common electrode blocks that forms the TX lines. For instance, rather than forming an RX line with a plurality of common electrode blocks arranged in column direction, a single large common electrode block that extends across the active area in the column direction can be used as a RX line.

In order to improve the touch-sensing accuracy at the edges of the display device 100, the common signal lines CS_LNs from the common electrode blocks positioned at each of the far most ends of the active area (i.e., left and right ends) can be grouped together such that RX lines are formed at the far most ends of the active area. In this way, touch inputs made by the object with a very smaller touch point (e.g., 2.5Φ) than a typical size of a finger can be recognized at the edges of the display device 100.

To further improve the performance of the touch-sensing capability, the width of the common electrode blocks that serve as the RX lines at the far most end of the display device 100 may be different from the width of other touch-sensing blocks 114 in the other areas of the panel 110. Configuring the common electrode blocks at the farthest ends of the display device 100 as the RX lines allows for more accurate touch input recognition even from the very end portions of the active area. However, this means that the location of the common electrode blocks that serve as the TX line will shift away from the edges by the width of the common electrode blocks serving as the RX line at the edges. Also, each TX line does not fully extend across the RX lines positioned at the edges. Accordingly, the width of the common electrode blocks at the edges may be narrower than the width of the common electrode blocks at other areas of the active area. For instance, the width of the common electrode blocks, measured in X-direction, at the edges of the active area may be ½ of other common electrode blocks.

To improve the touch-sensing accuracy at the upper and lower edges of the panel 110, the common electrode blocks at the upper and lower edges of the panel 110 can have a reduced width, measured in y-direction, as compared to other common electrode blocks at other areas of the panel 110. This way, narrower TX channels can be provided at the top and bottom edges of the panel 110. The number of TX and RX channels in the panel 110 can be adjusted according to the arrangement and sizes of the common electrode blocks in in the active area.

Referring back to FIGS. 2A and 2B, the signals provided to the common electrode blocks during the display period and during the touch-sensing period are transmitted from the drive ICs in the inactive area to the common electrode blocks in the active area via a plurality of common signal lines CS_LNs.

Each of the common electrode blocks in the self-capacitance touch recognition system depicted in FIG. 2A is provided with an independent common signal line CS_LN so that each common electrode block can act as a touch-sensing region with a unique coordinate within the active area.

In the mutual-capacitance touch recognition system depicted in FIG. 2B, each of the common electrode blocks is also connected with at least one common signal line CS_LN. The common signal lines CS_LNs extend in the same direction as the data lines DL toward the inactive area. Once the common signal lines CS_LNs are routed outside the active area, the common signal lines CS_LNs are selectively grouped together so that the common electrode blocks form touch-driving regions and touch-sensing regions. As shown in FIG. 2B, the common signal lines CS_LNs from the common electrode blocks that serve as the touch-driving regions and the touch-sensing regions are arranged parallel to each other and routed in the same direction. Grouping of the common signal lines CS_LNs is made outside the active area.

In both the self-capacitance and the mutual-capacitance touch recognition systems, each of the common electrode blocks are connected with at least one common signal line CS_LN, which extends parallel to one another and routed outside the active area in the same direction as the data lines DL. Arranging the common signal lines CS_LNs parallel to each other and having them routed across the active area toward the drive ICs allows to eliminate the space for routing the common signal lines CS_LNs from the sides of the display device, and thereby reducing the size of the bezel.

When routing the common signal lines CS_LNs across the active area, the common signal lines CS_LNs, except the ones that are connected to the common electrode blocks of the row or the column closest to the drive IC, are routed across other common electrode blocks. For instance, the common signal line CS_LN connected to the common electrode block B1 simply extends across the common electrode blocks B4, B7 and B10 to reach the inactive area where the drive ICs are located, without being in contact with the common electrode blocks in the route.

In these settings, the common signal lines CS_LNs cannot be positioned immediately above or below the common electrode blocks to directly interface with the surface of the common electrode block. In such a configuration, the common signal lines CS_LNs will be in contact with other common electrode blocks along path toward the inactive area. It will result in disrupting the unique coordinates of the common electrode blocks in the self-capacitance touch recognition system or breaking the formation of TX/RX lines in the mutual-capacitance touch recognition system.

When the common signal lines CS_LNs are positioned in the same layer as the pixel electrode, coupling generated between the common signal lines CS_LNs and the pixel electrode may cause various display defect when the common signal lines CS_LNs are used to modulate common electrode blocks during the touch-sensing period. That is, any reduction in the spacing between the common electrode blocks and the pixel electrode PXL for higher storage capacitance will also result in higher coupling capacitance between the common electrode blocks and the common signal lines CS_LNs.

Also, the common signal lines CS_LNs can be placed under the split area between the two adjacent common electrode blocks for lowering the coupling capacitance. However, such configuration can generates unwanted fringe field between the common electrode blocks and the common signal lines CS_LNs. This fringe field affects the LC molecules, leading to undesired light leakage. Thus, in order to route the common signal lines CS_LNs across the active area of the display device 100, the plane level of the common signal lines CS_LNs should be different from the plane levels of the pixel electrode and the common electrode blocks.

Placing the common signal lines CS_LNs between the layer of pixel electrode and the layer of common electrode blocks poses similar problems. In such a configuration, an insulation layer should be provided between the layer of the common electrode blocks and the layer of common signal lines CS_LNs. At the basic level, the thickness of the common signal lines CS_LNs cannot be greater than the thickness of the insulation layer between the layer of pixel electrodes and the layer of common electrode blocks. Also, the thickness of the insulation layer interposed between the pixel electrode and the common electrode blocks is limited in the IPS or the FFS mode LCD device, which in turn limits the thickness of the common signal lines CS_LNs.

For instance, when the thickness of the insulation layer interposed between the pixel electrode and the common electrode blocks is about 3000 Å, the thickness of the common signal lines CS_LNs is limited to about 2500 Å if the common signal lines CS_LNs are to be placed between the common electrode blocks and the pixel electrode. The resistance varies by the thickness of the common signal lines CS_LNs. As such, limiting the thickness of the common signal lines CS_LNs increases the resistance, and the common signal lines CS_LNs may not be able to transmit signals from the drive ICs to the common electrode blocks, especially as the size of the display area in the device becomes larger.

Accordingly, in the embodiments of the display devices described in the present disclosure, the common signal lines CS_LNs are positioned such that they are sufficiently spaced apart from the pixel electrode and the common electrode blocks. In this way, the width and thickness of the common signal lines CS_LNs may not be limited by the distance between the pixel electrode and the common electrode blocks. To this end, one or more planarization layer is provided between the common signal lines CS_LNs and the common electrode blocks, and the common signal lines CS_LNs are connected to the corresponding common electrode blocks via the contact holes through the planarization layers. In such settings, each of the common signal lines CS_LNs connected to a common electrode block can be routed across the active area without contacting other common electrode blocks placed along its route. The common signal lines CS_LNs can simply bypass the common electrode blocks along the path to the drive-ICs in the inactive area.

Figure 4A:
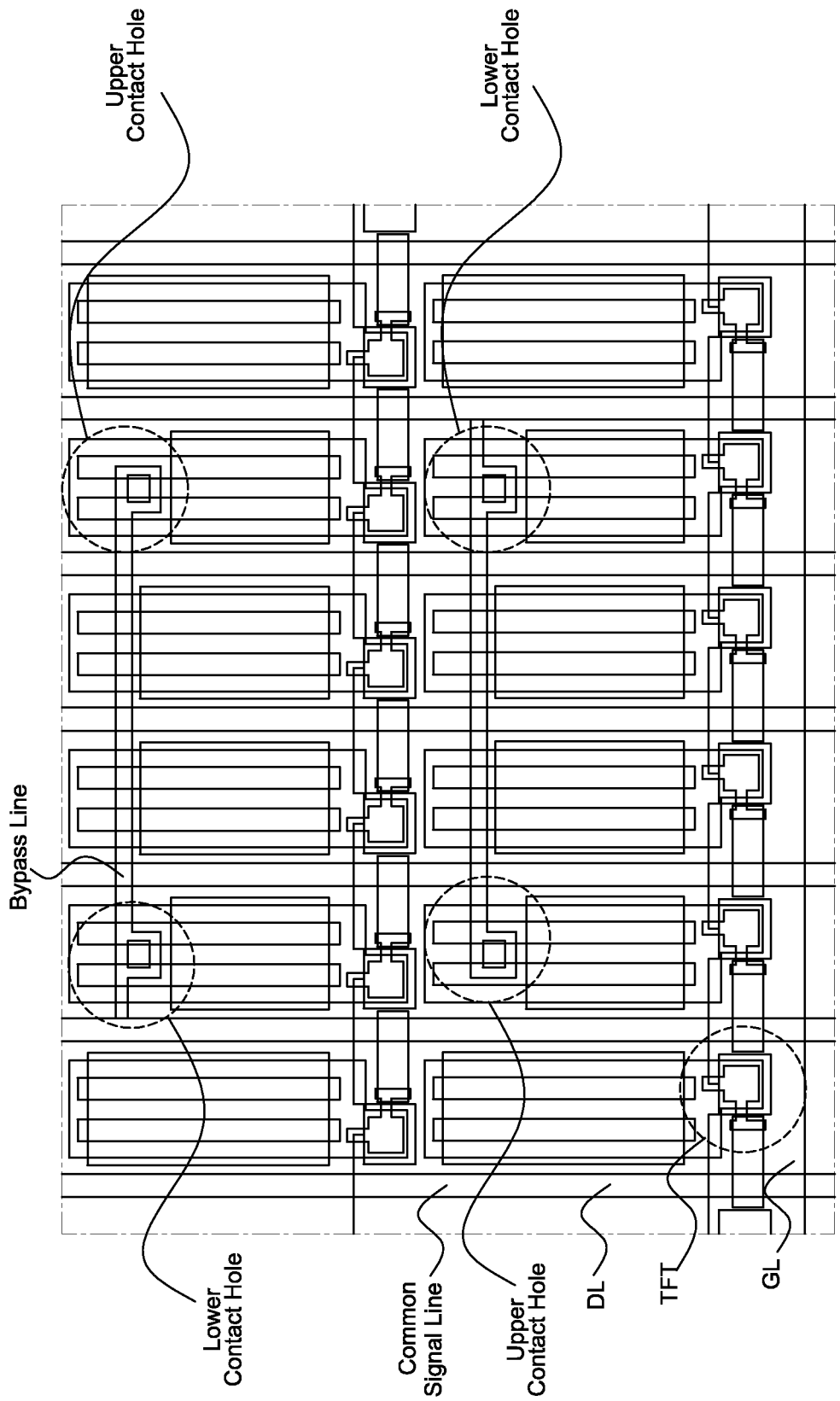
FIG. 4A is a plan view of an exemplary touch recognition enabled display device having the common signal lines CS_LNs disposed under the thin-film-transistors according to an embodiment of the disclosure.
Figure 4B:
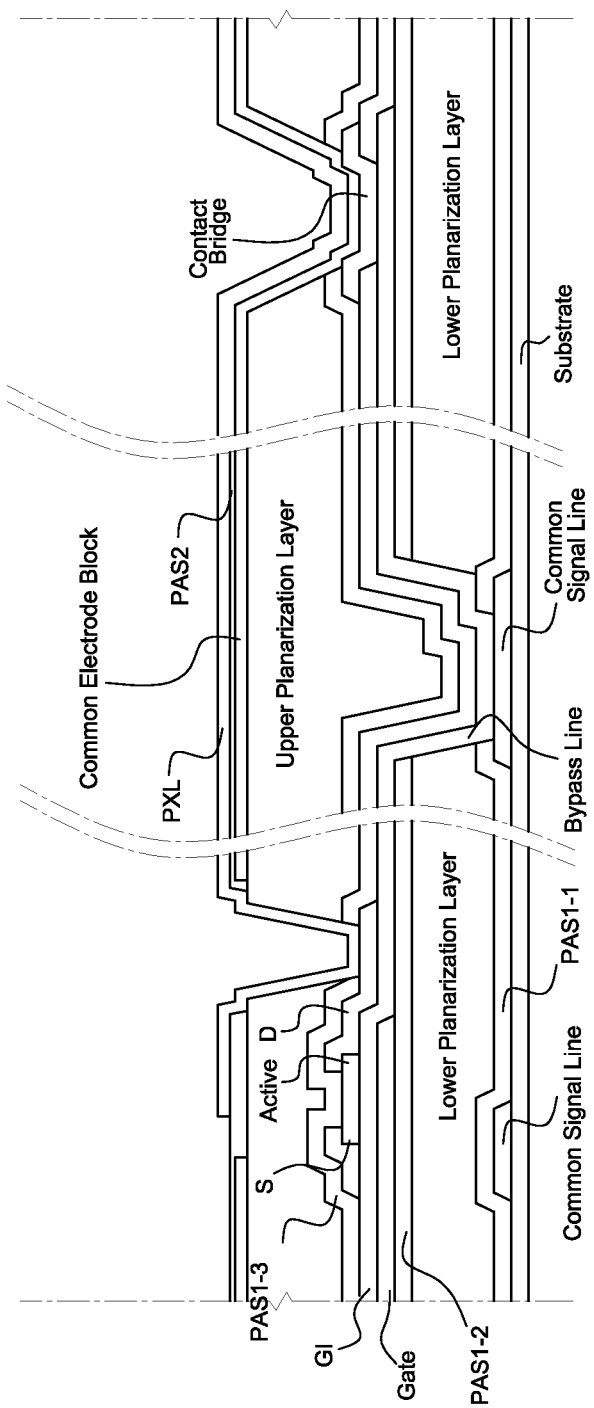
FIG. 4B is a cross-sectional view of the exemplary touch recognition enabled display device depicted in FIG. 4A.
Figure 4C:
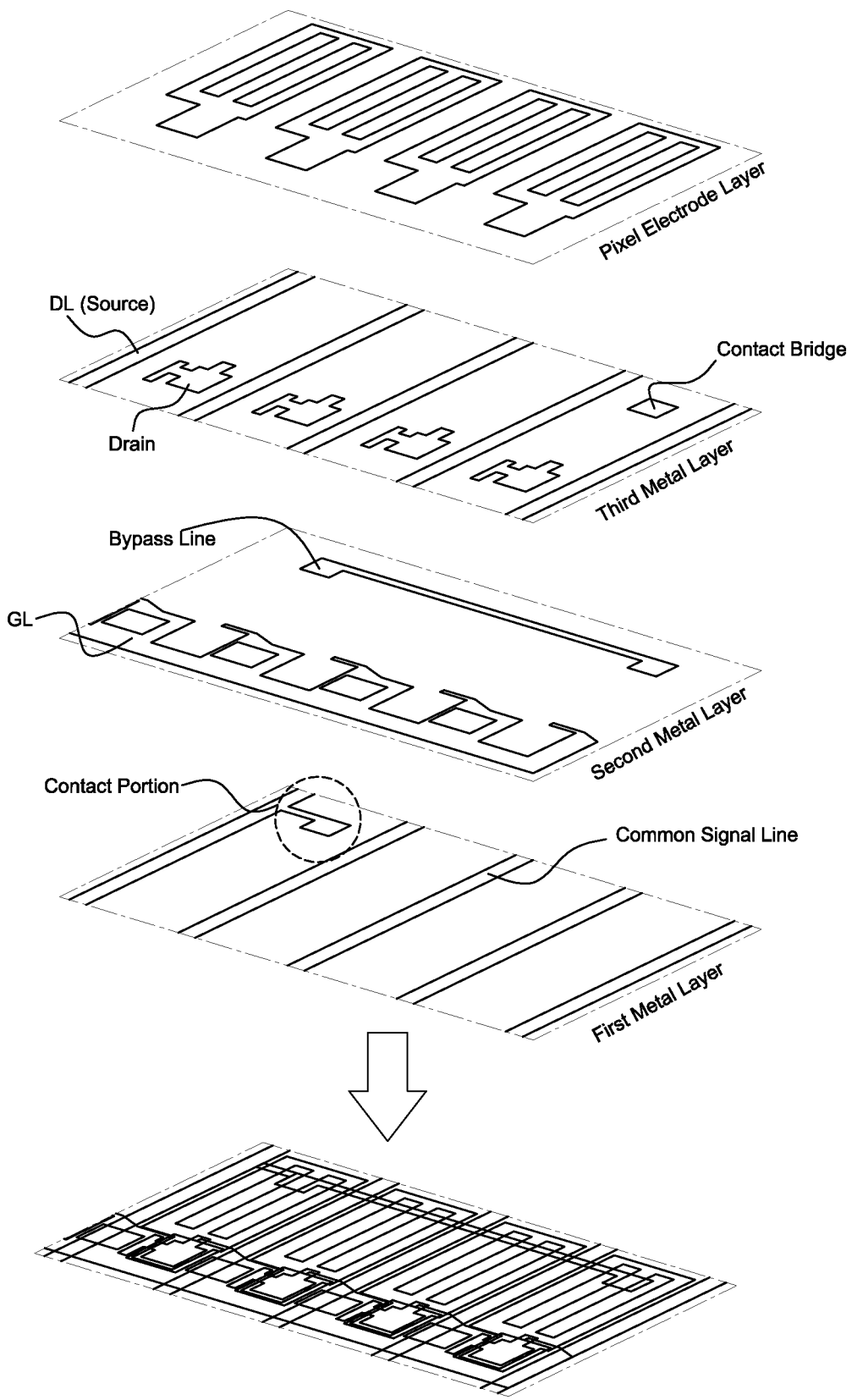
FIG. 4C is a schematic illustration showing the order in which the metal layers are disposed over one another in the exemplary touch recognition enabled display device depicted in FIGS. 4A and 4B.

FIG. 4A is a plane view that illustrates an exemplary configuration of the common signal lines CS_LNs according to an embodiment, in which the common signal lines CS_LNs are disposed below the TFTs of the pixels. FIG. 4B is a cross-sectional view that illustrates the configuration of the common signal lines CS_LNs shown in FIG. 4A. FIG. 4C illustrates the order in which the metal layers are disposed over one another in the exemplary touch recognition enabled display device depicted in FIGS. 4A and 4B.

Referring to FIG. 4A, the common signal lines CS_LNs are arranged to extend in the same direction as the data lines, and each common signal line CS_LN is positioned to overlap with a data line to minimize reduction in the aperture ratio of the pixels by the common signal lines CS_LNs. Also, the TFT in the pixel is configured in the similar way as the other embodiments discussed above. That is, the TFT has the bottom gate structure, with the source and drain connected at the opposite ends of the channel. The source electrode of the TFT extends from or otherwise connected to the data line, and the drain is connected to the pixel electrode of the corresponding pixel. The pixel electrode is provided with a plurality of slits to generate fringe field with the overlapping common electrode block.

The common signal lines CS_LNs are placed under the TFTs of the pixels, and each of the common electrode blocks is connected to the ones of the corresponding common signal lines CS_LNs via contact holes through the planarization layers formed over the TFTs. In this configuration, each common signal line CS_LN is connected to at least one bypass line BP_LN that is connected to the corresponding common electrode block. As shown in FIG. 4A, the bypass line BP_LN can be arranged in a transverse to the common signal lines CS_LNs such that a bypass line BP_LN extends from one pixel to another pixel. That is, the connection between the bypass line BP_LN and the common signal line CS_LN can be made in one pixel region, and the connection between the bypass line BP_LN and the common electrode block can be made in another pixel region.

Referring to FIGS. 4B and 4C, the common signal lines CS_LNs are provided on the substrate. In this example, the metal layer used in forming the common signal lines CS_LNs may be referred to as the first metal layer, and for convenience of explanation, the order of other metal layers may be referred in reference to the first metal layer.

It should be noted that the term "first metal layer" do not necessarily mean that the layer is comprised of a single metal layer. Rather, the term "first metal layer" refers to a metal layer or a stack of metal layers capable of being patterned on a surface and insulated from another layer of metal layer or another stack of metal layers by an insulation layer. Similar to the first metal layer, each of the second metal layer and the third metal layer may be formed of a stack of multiple layers of different metals. In some embodiments, the first metal layer may be formed of a stack of a copper layer (Cu) and a molybdenum-titanium alloy layer (MoTi). The second metal layer may also be a stack of a copper layer (Cu) and a molybdenum-titanium alloy layer (MoTi). The third metal layer may be a stack of a molybdenum-titanium alloy layer (MoTi), copper layer (Cu) and another molybdenum-titanium alloy layer (MoTi). The copper layer may be thicker than the molybdenum-titanium alloy layer in each of the metal layers. The second metal layer may be referred to as the gate metal layer and the third metal layer may be referred to as the source/drain metal layer.

To provide an array of TFTs on the common signal lines CS_LNs, a lower planarization layer PLN-L is provided over the common signal lines CS_LNs. The thickness of the lower planarization layer PLN-L may vary depending on the thickness of the common signal lines CS_LNs. For example, the thickness of the common signal lines CS_LNs may range from about 2500 Å to about 7500 Å, and more preferably from about 3500 Å to about 6500 Å, and more preferably from about 4500 Å to about 5500 Å. The thickness of the lower planarization layer PLN-L may range from about 1 μm to 4 μm, and more preferably from about 1 μm to 3 μm, and more preferably from about 1 μm to 2 μm. The thickness of the planarization layer that covers the common signal lines CS_LNs can vary based on various factors, such as the dielectric property, material, fabrication process, and more.

Since the array of TFTs is to be fabricated on the lower planarization layer PLN-L, the material for the lower planarization layer PLN-L cannot be the photo-acryl that is used as the planarization layer over the TFTs. Some of the process for fabricating the TFTs may be carried out in high-temperature, and thus the lower planarization layer PLN-L should be able to sustain its quality even under conditions during the TFT fabrication processes. For example, some of the processes during the fabrication TFTs with oxide semiconductor layer, such as IGZO (indium-Gallium-Zinc-Oxide), may be carried out at about 350 degrees Celsius or more. As such, the lower planarization layer PLN-L may be formed of material that can maintain the planarizing functionality at more than 350 degrees Celsius, and more preferably between 350 degrees Celsius and 380 degrees Celsius. To this end, silicon based inorganic material with high thermal stability is desirable for the lower planarization layer PLN-L (i.e., SOG layer). The material should also be suitable for processes for covering over the common signal lines CS_LNs as a planarization layer. For instance, inorganic material with high thermal stability may be disposed over the common signal lines CS_LNs as the lower planarization layer PLN-L by using the spin-on-glass method, slit coating method or other suitable coating methods. After the inorganic material is coated over the common signal lines CS_LNs, curing process may be performed.

A passivation layer PAS1-1, which may serve as a capping layer, can be provided between the common signal lines CS_LNs and the lower planarization layer PLN-L. On the lower planarization layer PLN-L, the gate lines GL and the gates of the TFTs are provided with the second metal layer. The bypass lines BP_LNs are also provided on the lower planarization layer PLN-L with the second metal layer. The semiconductor layer ACT (e.g., oxide, LTPS, a-Si) is patterned on the gate insulation layer GI, which covers the gate lines GL, the gates of the TFTs and the bypass lines BP_LNs. The data line DL, which is connected to the source of the TFT, is formed with the third metal layer.

Further, another passivation layer PAS1-2 may be provided between the lower planarization layer PLN-L and the array of TFTs. Here, the passivation layer PAS1-2 may provide some protection for components that are placed on the lower planarization layer PLN-L from undesired fumes (e.g., hydrogen fumes) from the lower planarization layer PLN-L.

The material and configuration of the passivation layer between the lower planarization layer PLN-L and the array of TFT can vary depending on the semiconductor layer (i.e., active layer) of the TFTs in the array. For example, the passivation layer PAS1-2 may be a silicon nitride layer, a silicon oxide layer or stacks of such layers. In some suitable embodiments, the passivation layer PAS1-1 under the lower planarization layer PLN-L and the passivation layer PAS1-2 on the planarization layer PLN-L may be provided in a substantially the same thickness, and may be formed of the same inorganic material. For instance, both the passivation layer PAS1-1 and the passivation layer PAS1-2 may be silicon nitride layer of about 2000 Å.

In particular, at least some of the TFTs provided on the lower planarization layer PLN-L may include the oxide metal semiconductor layer such as indium-gallium-zinc oxide, and a silicon nitride layer can be interposed between the lower planarization layer PLN-L and the TFTs formed thereon. To maximize the protection from the hydrogen fume, contact hole for connecting the bypass line BP_LN and the common signal line CS_LN may be formed prior to forming the passivation layer PAS1-2 on the lower planarization layer PLN-L. That is, the contact hole can be formed after the formation of lower planarization layer PLN-L, and the passivation layer PAS1-2 can be formed over the lower planarization layer PLN-L with the contact hole already formed therein. In this way, the passivation layer PAS1-2 will cover even the surfaces within the contact hole. An etching process can be performed to open the actual contact region of the common signal line CS_LN for connection with the bypass line BP_LN.

The connection between a bypass line BP_LN with the corresponding common electrode block may be made via a contact bridge placed on the bypass line BP_LN. More specifically, the contact bridge can be formed with the third metal layer and placed at the contact region of the bypass line BP_LN exposed through the upper contact hole CNT-U.

To provide a planar surface for placing the common electrode blocks, the upper planarization layer PLN-U is provided over the TFTs and the bypass lines BP_LN. As shown, a passivation layer PAS1-3 formed of inorganic material, such as SiNx and/or SiOx, may be interposed between upper planarization layer PLN-U and the third metal layer. Another passivation layer PAS2 is interposed between the common electrode blocks and the pixel electrodes PXL provided on the upper planarization layer PLN-U.

As describe, when the common signal lines CS_LNs are provided under the TFTs, the bypass lines BP_LNs are used to provide connections between the common signal lines CS_LNs and the corresponding common electrode blocks. To this end, each common signal line CS_LN is in contact with a bypass line BP_LN via a lower contact hole CNT-L through the lower planarization layer PLN-L and the passivation layers PAS1-1/PAS1-2 thereunder. Also, the connection between the bypass line BP_LN and the common electrode block is made via the upper contact hole CNT-U through the upper planarization layer PLN-U and the passivation layer thereunder. The contact bridge on the bypass line BP_LN can be exposed through the upper contact hole CNT-U so that it can be in contact with the common electrode block.

As shown in FIG. 4C, the common signal line CS_LN may include a contact portion extended to the location of the lower contact hole CNT-L. Similarly, the bypass line BP_LN may include a contact portion at the location of the lower contact hole CNT-L in the lower planarization layer PLN-L. Although the FIGS. 4B and 4C only illustrate one common signal line CS_LN being provided with the contact portion, other common signal lines CS_LNs may also be provided with the contact portion so that they can be connected to the corresponding bypass lines BP_LNs. Note that a common electrode block can be connected with multiple common signal lines CS_LNs. In such cases, multiple common signal lines CS_LNs may be connected to a single bypass line BP_LN, which is connected to a corresponding common electrode block. As such, each pixel group may include multiple sets of bypass pixels, each set including the bypass pixels consecutively arranged from the pixel with the lower contact hole CNT-L to the pixel with the upper contact hole CNT-U of the respective bypass line BP_LN.

Each common signal line CS_LN may be placed under and extended along a data line DL. Although most part of the common signal line CS_LN is concealed under the overlapping data line DL, the contact portion of the common signal line CS_LN for connection with the bypass line BP_LN may not be under the data line. Also, the bypass lines BP_LNs are formed in the second metal layer, which is the same non-transparent metal as the gate lines and the gate electrode of the TFTs, and the bypass lines BP_LNs cannot be positioned to overlap with the gate lines GL. Therefore, the bypass lines BP_LNs can block the light from the light source (e.g., backlight) to pass through, and reduce the aperture ratio of the pixels. Even for self-light emitting display such as the OLED, the bypass lines BP_LNs can reflect external light from the out of the device and make it difficult to see the images on the screen. Thus, similar to the gate lines and data lines, it is preferred that the bypass lines BP_LNs to be concealed under the masking layer BM as much as possible.

Since the masking layer BM defines the aperture ratio of the pixels, covering the bypass lines BP_LNs results in reduction in the aperture ratio of the pixels where the bypass lines BP_LNs are arranged therein. Because at least one bypass line BP_LN is needed to connect a common signal line CS_LN to the common electrode block, each pixel group includes pixels with reduced aperture ratio (referred hereinafter as "bypass pixels") as well as the "normal pixels" in which the bypass line BP_LN is not extended therein.

Referring back to FIG. 4A, the lower contact hole CNT-L for connecting the common signal line CS_LN to the bypass line BP_LN is provided in one of the pixel, and the upper contact hole CNT-U for connecting the bypass line BP_LN to the common electrode block is provided in another pixel. The aperture of the pixels located at the regions corresponding to the lower contact hole CNT-L and the upper contact hole CNT-U may be decreased more than the intermediate pixels laid between the pixels accommodating the lower contact hole CNT-L and the upper contact hole CNT-U.

Accordingly, the lower contact hole CNT-L and the upper contact hole CNT-U may be provided at certain selective pixels. For example, blue pixels have the lower luminance as compared to green and red pixels. Thus, the actual amount of luminance decreased by the reduction in the aperture ratio of the pixel is less for the blue pixel as compared to red and green pixels. Therefore, in some embodiments, the lower contact hole CNT-Ls and the upper contact hole CNT-Us may be provided in the blue pixels. In this regard, the blue pixels can be positioned immediately adjacent to each other, for instance, blue pixels from the same column, but one each from two immediately adjacent rows. The blue pixels need not be positioned immediately adjacent to each other. For instance, the blue pixels for accommodating a lower contact hole CNT-L and an upper contact hole CNT-U for connection of a bypass line BP_LN can be from the same row as depicted in FIG. 4A.

Depending on the size and location, considerable difference in the aperture ratio can result between the bypass pixels and the normal pixels. The portion of the bypass line BP_LN corresponding to the contact holes for connecting the bypass line BP_LN to the common signal line CS_LN and to the common electrode block may be larger than other portions of the bypass line BP_LN. As such pixels where the contact holes in the lower planarization layer PLN-L for connecting the common signal line CS_LN to the bypass line BP_LN and in the upper planarization layer PLN-U for connecting the common electrode block to the bypass line BP_LN may have even smaller aperture ratio than other bypass pixels between the two. Such difference in the aperture ratio between the pixels may be visually noticeable, especially if the differences are repeated in a specific pattern.

Accordingly, in some embodiments, some of the bypass lines BP_LNs can be arranged differently from other bypass lines BP_LNs. For example, the placement of the contact holes for some of the bypass lines BP_LNs can be configured differently from that of other bypass lines BP_LNs. By way of example, the lower contact hole CNT-L and the upper contact hole CNT-U for some bypass lines BP_LNs may be placed in pixels positioned in left and right sides, respectively. For some other bypass lines BP_LNs, the lower contact hole CNT-L and the upper contact hole CNT-U may be placed in pixels positioned in right and left sides, respectively. Such configuration can make the pattern less noticeable by the users.

In some embodiments, bypass lines BP_LNs can be arranged such that they extend from the pixel at one end of a common electrode block to the pixel at the opposite end of that common electrode block. Although, much greater number of pixels will be affected by the bypass lines BP_LNs, it can suppress visible patterns. In some embodiments, the lower contact hole CNT-L and the upper contact hole CNT-U can be provided in the pixels immediately adjacent to each other. In such configuration, there will be no visible patterns, as the aperture of all pixels will be decreased by the contact holes.

In some embodiments, the masking layer BM may be configured to compensate for the reduction in the aperture ratio of the bypass pixels. More specifically, the strips of masking layer BM extending orthogonal to the strips of masking layer BM covering the bypass line BP_LN can be configured to compensate the aperture ratio discrepancy between the bypass pixels and the normal pixels. In cases where the bypass lines BP_LNs are arranged to extend in the same orientation as the gate lines GL as shown in FIG. 4A, the strips of the masking layer BM covering the data line DL, which may be referred in the present disclosure as the data BM strips, can be adjusted to compensate the amount of aperture ratio difference between the bypass pixels and the normal pixels. In cases where the bypass lines BP_LNs are oriented in the same direction as the data lines DL, the strips of the masking layer BM covering the gate lines, which may be referred to as the gate BM strips, can be adjusted to reduce the amount of aperture ratio difference between the bypass pixels and the normal pixels.

Figure 5A:
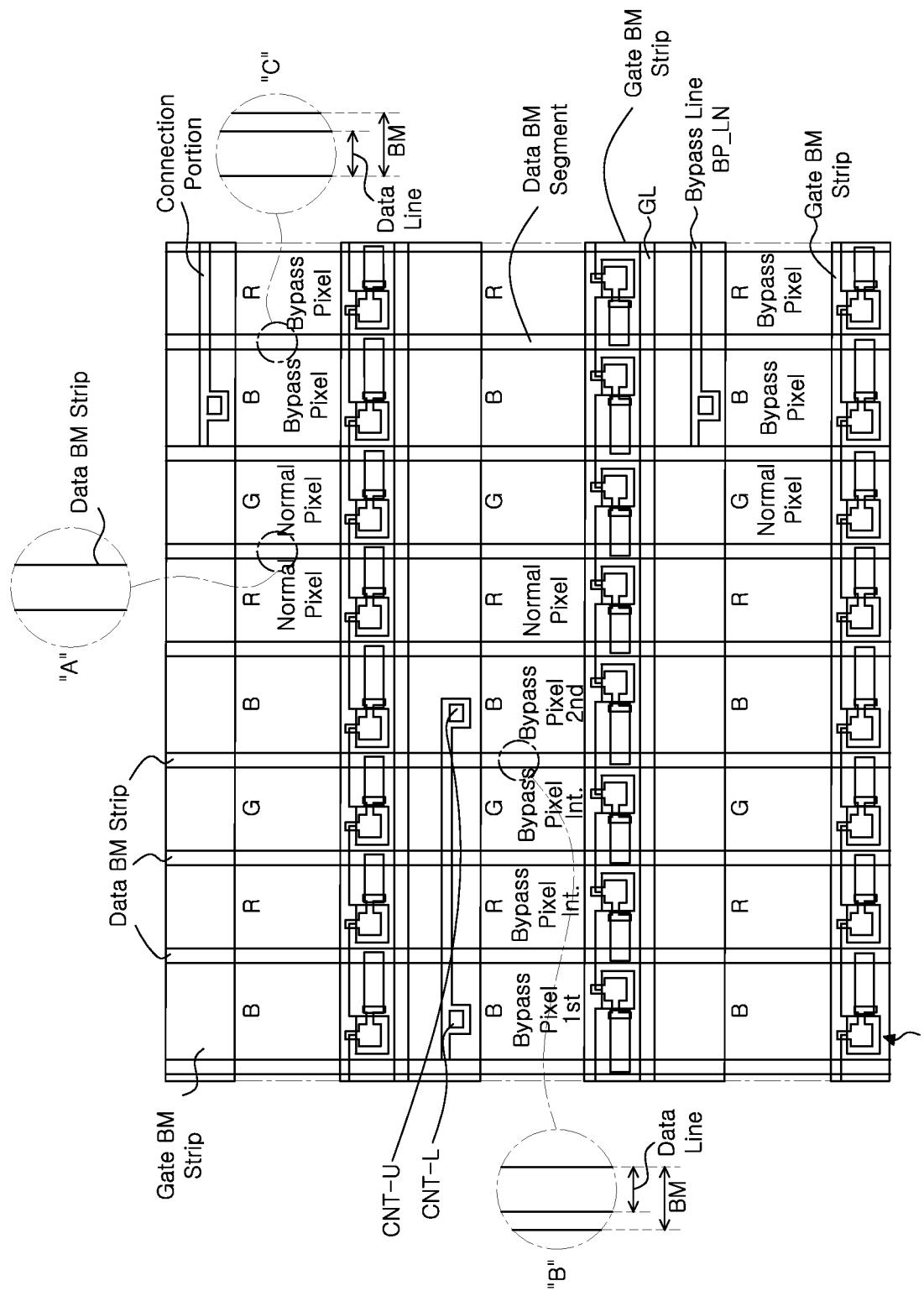
FIG. 5A is a schematic illustration showing exemplary configuration of the masking layer BM according to an embodiment of the present disclosure.

FIG. 5A, shows configuration that can be adopted at some of the specific segments of the data BM strips in the display device. In order to reduce the aperture ratio discrepancy among the pixels, some of the segments in a data BM strip can be asymmetrically arranged from other segments of the same data BM strip. At the basic level, segments of the data BM strips corresponding to the bypass pixels can be narrower than the segments corresponding to the normal pixels. In other words, in a strip of masking layer BM, the portions next to the bypass pixels can be provided with a narrower width than the portions that are not neighboring the bypass pixels.

In such configurations, the portions of the data BM strips placed between two normal pixels may be configured to be wider than other portions of the data BM strip. That is, if any one of the pixels on the left and the right sides of the segment is the bypass pixel, then the width of the data BM at that segment may be narrower than the width of segments between two normal pixels. In this way, the reduction in the aperture ratio of the bypass pixels due to the bypass lines BP_LNs can be compensated to some degrees.

In some embodiments, the data BM segments between two immediately adjacent normal pixels may be provided with a greater width than the data BM segments positioned next to the first bypass pixel with the lower contact hole CNT-L, the second bypass pixel with the upper contact hole CNT-U or any intermediate bypass pixels between the first bypass pixel and the second bypass pixel. That is, in each of the data BM strips, data BM segments positioned next to a first bypass pixel, a second bypass pixel or any intermediate bypass pixels between the first bypass pixel and the second bypass pixel is narrower than other data BM segments positioned at between two immediately adjacent normal pixels.

In some embodiments, the data BM segments that are neighboring the first bypass pixel, the second bypass pixel or any intermediate pixels between the first bypass pixel and the second bypass pixel may have substantially the same width, which is narrower than a width of data BM segments positioned between two immediately adjacent normal pixels.

As such, the width of the data BM segments next to the bypass pixels may be set to the narrowest possible width, and the segments between the normal pixels can be provided with extra width. Accordingly, the differences in the width of the masking layer BM (e.g., the data BM strips) can compensate the aperture ratio discrepancy due to the placement of the bypass lines BP_LNs. It should be noted that the width difference of the data BM segments needs not be large to make the aperture ratio of the pixels exactly the same. The width difference between the segments of the data BM strips may provide some degree of compensation to the aperture ratio difference between the pixels.

Figure 5B:
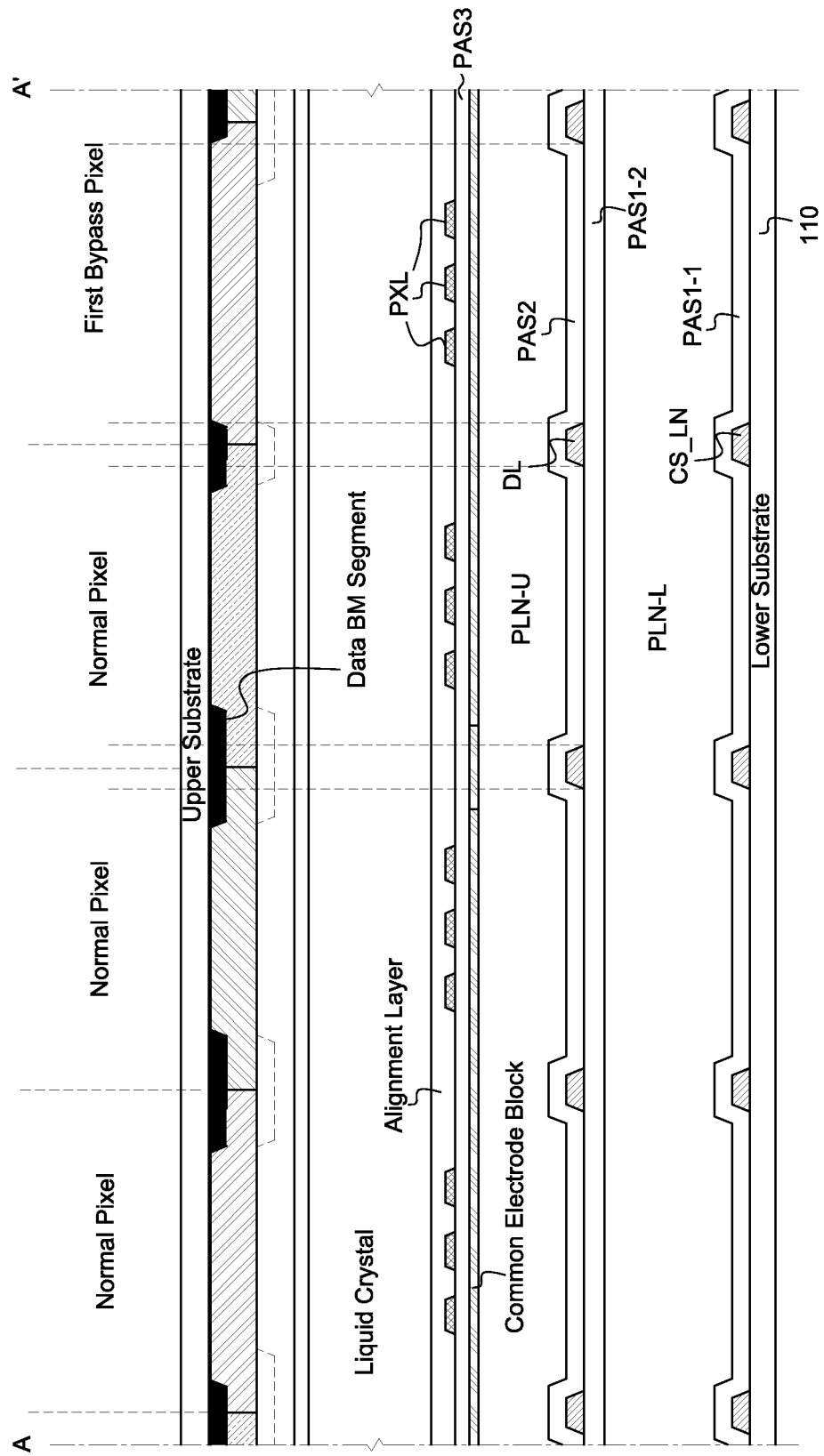
FIG. 5B is a cross-sectional view of the enlarged section "A" in FIG. 5A.

FIG. 5B illustrates the enlarged section "A" depicted in FIG. 5A. By way of example, the width of the segments in the data BM strip neighboring the bypass pixels may be about 5 to 6 um while the width of the segments between the normal pixels may be about 7 to 8 um. The widths of the data line and the common signal line CS_LN should be equal to or less than the width of the segment with the shorter width. In other words, the widths of the data line and the common signal line CS_LN placed thereunder may set the minimum width of the data BM segments next to the bypass pixels may set. In such configuration, the width of the data BM segments between the normal pixels (i.e., wider portions of the data BM strips) may be greater than the width of the data line and the common signal line CS_LN below. Thus, extra width of the data BM segment may be distributed equally on both sides on the data line. If the data BM segment between the two normal pixels has 3 m of extra width then the data line and/or the common signal line CS_LN below, 1.5 um of the data BM segment can overhang on each side of the data line and/or the common signal line CS_LN below as depicted in FIG. 5B.

Of course, either one of the data line and the common signal line CS_LN can be narrower than the reduced width segments of the data BM strip. However, keeping the width of the common signal lines CS_LNs as wide as possible (i.e., up to the reduced width of the data BM segment next to the bypass pixels) can help in controlling the angle in which the light from the backlight travels towards the color filter. For example, the light from the backlight intended for a certain pixel leaking into other nearby pixel can be suppressed.

Further, in some of the embodiments, some of the data BM segments may be configured to be off-centered in relation to the center of the data line placed thereunder. For instance, the data BM segments between a pixel with a contact hole and a normal pixel may be configured asymmetrically from other segments of the data BM strip. As mentioned above, the pixels that are accommodating the contact holes may suffer the most in terms of aperture ratio by the bypass line BP_LN. Therefore, the segments of data BM strips positioned next to the pixels with the lower contact hole CNT-L and the pixels with the upper contact hole CNT-U can be configured to provide the maximum compensation of aperture ratio to those pixels.

Accordingly, in some embodiments, the data BM segments neighboring the first bypass pixel or the second bypass pixel is asymmetrically configured with respect to other segments of the data BM strips, such that a distance in which the data BM segment overhangs beyond an edge of the data line thereunder in a direction toward the first bypass pixel or the second bypass pixel is shorter than a distance that the data BM segment overhangs beyond the edge of the respective data line in the opposite direction.

Figure 5C:
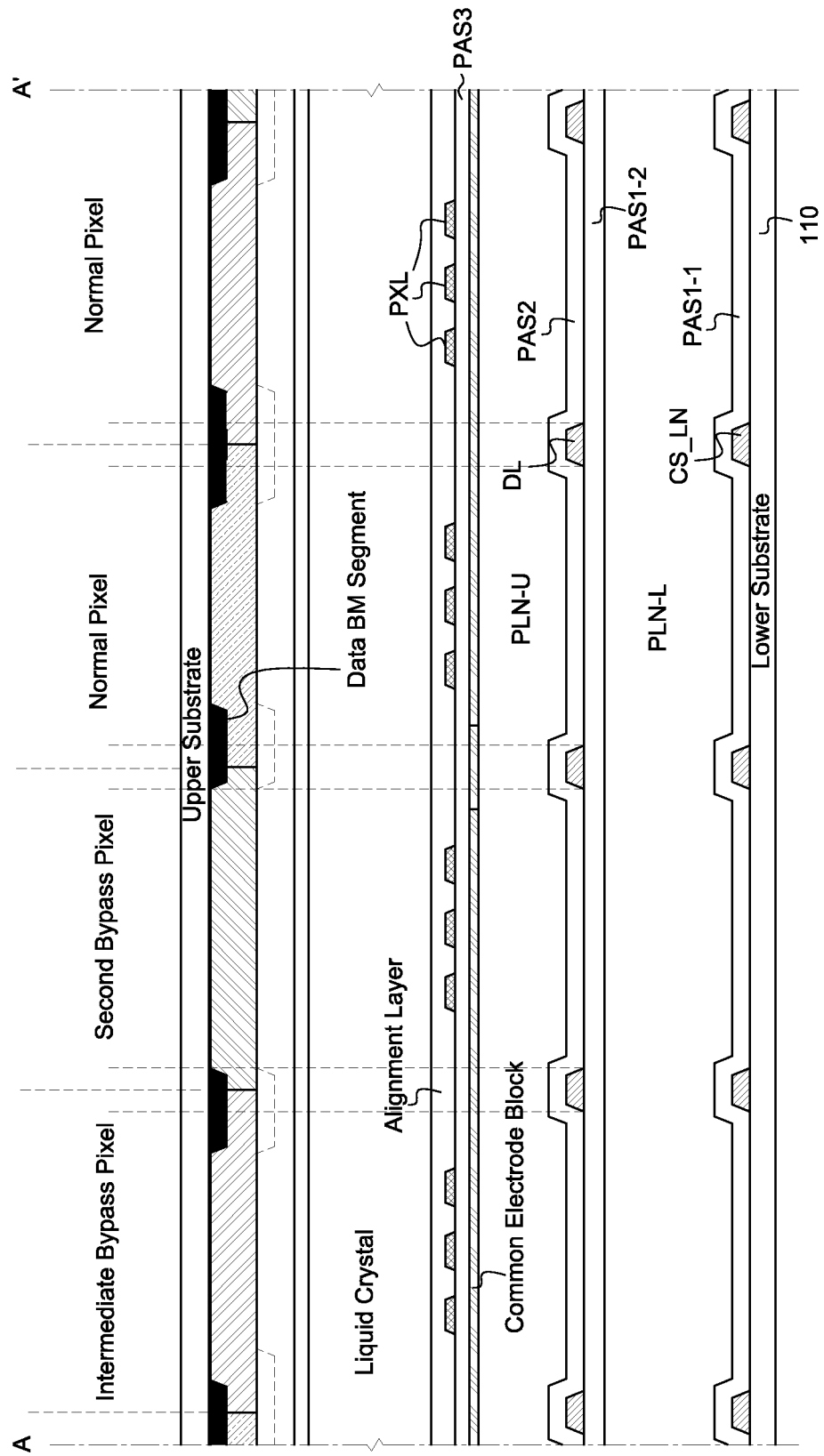
FIG. 5C is a cross-sectional view of the enlarged section "B" in FIG. 5A.
Figure 5D:
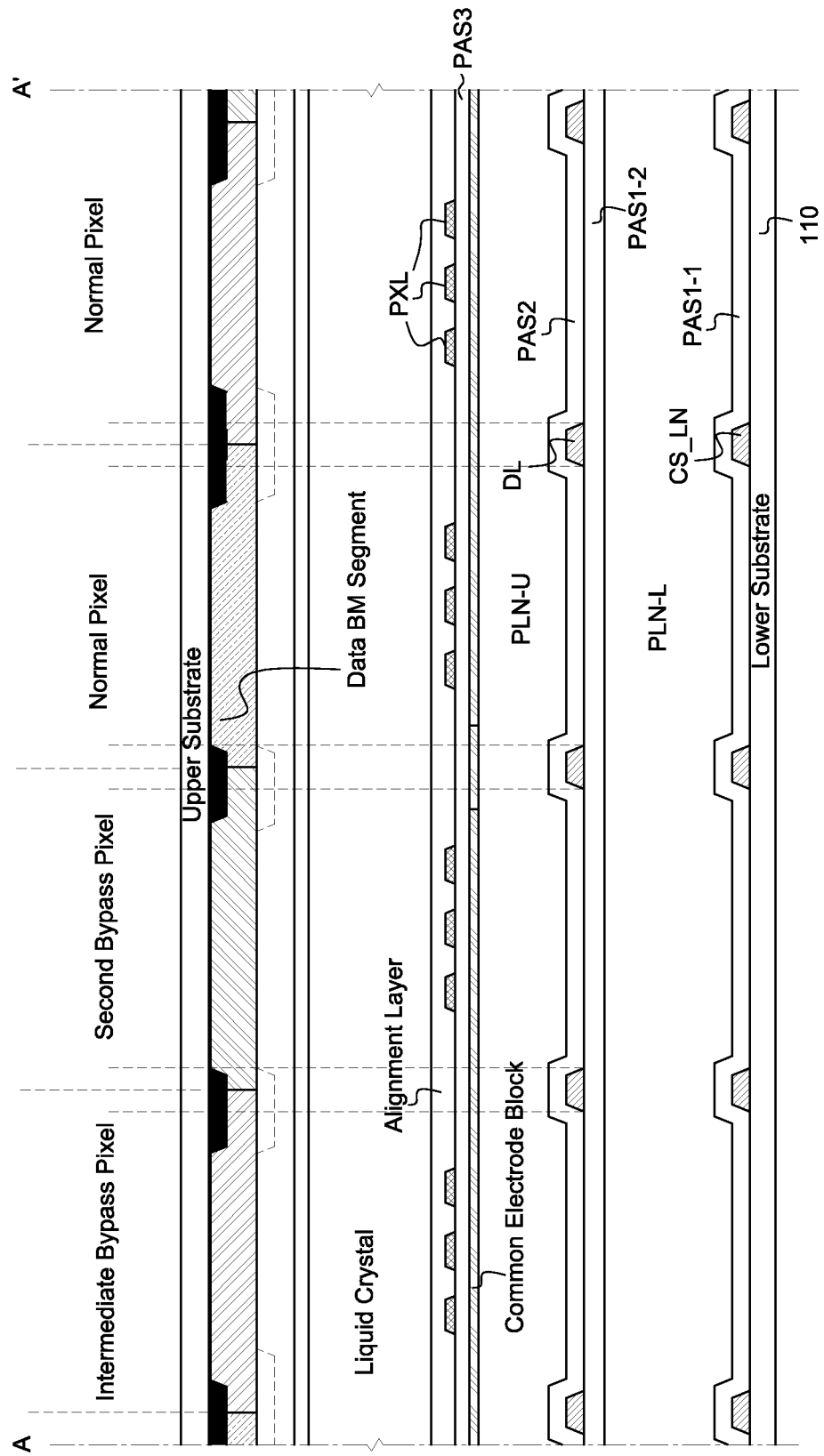
FIG. 5D is a cross-sectional view of the enlarged section "C" in FIG. 5A.

FIGS. 5C and 5D illustrate the enlarged section "B" and "C" depicted in FIG. 5A, respectively. As shown in FIGS. 5C and 5D, the edge of the data BM segment and the edge of the data line (and the common signal line CS_LN) toward the pixel with the contact hole can be arranged to be justly (vertically) aligned to each other. Note that the BM segment should cover both the data line and the common signal line CS_LN there under, and thus, the edge of the data BM segment and the edge of the common signal line CS_LN may be aligned to each other toward the pixel with the contact hole. In other words, either the edge of the data line or the common signal line CS_LN, whichever is closer to the pixel with the contact hole, can be aligned with the edge of the data BM segment.

In some embodiments, the data BM segments between a normal pixel and any one of the first bypass pixel or the second bypass pixel is asymmetrically configured such that edge of the data BM segment facing the bypass pixel accommodating either one of the contact holes are substantially aligned with an edge of the corresponding data lines facing the same direction, whereas an opposite edge of the data BM segment facing the normal pixel is extended further out toward the normal pixel than an opposite edge of the corresponding data lines facing the same direction.

In some embodiments, the first bypass pixel and the second bypass pixel may be positioned immediately adjacent to each other. For instance, the first bypass pixel that accommodates a lower contact hole CNT-L for one of the bypass lines BP_LNs may be positioned immediately next to a second bypass pixel that accommodates an upper contact hole CNT-U for another one of the bypass lines BP_LNs. In such cases, a data BM segment can be positioned between two immediately adjacent pixels that one includes the lower contact hole CNT-L and the other includes the upper contact hole CNT-U, and such data BM segment can be configured such that the data BM overhangs on both outside edges of the underneath data line in the same distance.

In some embodiments, the data BM segment between the first bypass pixel and an intermediate bypass pixel between the first bypass pixel and the second bypass pixel is asymmetrically configured such that a distance in which the data BM segment overhangs outside the edge of the data line thereunder toward the first bypass pixel is shorter than a distance in which the respective data BM segment overhangs outside the edge of the respective data line toward the intermediate bypass pixel.

In some embodiments, the first bypass pixel and the second bypass pixel are two adjacent blue pixels in the same pixel group. In some embodiments, the first bypass pixel and the second bypass pixel are two adjacent blue pixels in the same pixel group, and at least one intermediate bypass pixel is provided between the first bypass pixel and the second bypass pixel.

With FIGS. 4A-5D, the embodiments have been described with the common signal lines CS_LNs extended along under the corresponding data lines. However, features described herein can also be used even when the common signal lines CS_LNs are arranged to extend along under the gate lines. Further, embodiments have been described in the context of LCD display device the having the pixel-top configuration. However, the configuration of the common signal lines CS_LNs under the TFTs and the connections to the corresponding common electrode blocks via the bypass lines BP_LNs as well as the asymmetric masking layer BM configuration for compensation of aperture ratio discrepancy can be equally applied to the VCOM-top configuration.

In the present disclosure, all of the embodiments have been described as having the common signal lines CS_LNs and the data lines positioned to overlap one another. The width of the common signal lines CS_LNs can be equal to the width of the data lines. However, it should be noted that the width of the common signal lines CS_LNs and the width of the data lines can differ from each other. With the common electrode being provided in a plurality of common electrode blocks, the field at the region between the two adjacent common electrode blocks can be different from other regions on the common electrode block. As such, controlling of the liquid crystal molecules over such regions may be difficult, and the light from the backlight can leak into the pixels near such regions.

Accordingly, a data line and a common signal line CS_LN can be placed in the region between the two adjacent common electrode blocks. This way, the data line and the common signal line CS_LN can be used to block the light from the backlight. The width of the data lines and the width of the common signal lines CS_LNs can be adjusted according to the distance between the two adjacent blocks. In this regard, increasing the width of the common signal lines CS_LNs can help reduce the resistance and lower the RC delay on the common signal lines CS_LNs. In the embodiments with the common signal lines CS_LNs disposed under the data lines, the width of the common signal lines CS_LNs can be greater than the width of the data lines. Since the common signal lines CS_LNs are placed further away from the common electrode blocks and the pixel electrodes than the data lines, managing the coupling capacitance may be easier for the common signal lines CS_LNs than the data lines.

The number of data lines in the panel may be much greater than the number of common electrode blocks. Therefore, the common signal lines CS_LNs may be placed only under/over some of the data lines. However, placing the common signal lines CS_LNs to overlap with a data line changes the data line capacitance. In order for the data lines to have uniform data line capacitance, additional common signal lines CS_LNs or dummy common signal lines CS_LNs may be provided in the panel, so that each of the data lines are overlapped by these conductive lines.

The dummy common signal lines CS_LNs refer to the conductive lines formed in the same layer as the common signal line CS_LN, but not connected to the drive-ICs. As such, the dummy common signal lines CS_LNs do not supply the common voltage signal or the touch related signals, even though they are arranged in the active area in the similar fashion as the real common signal lines CS_LNs. Leaving the dummy common signal lines CS_LNs in floating state can cause electro-static, which may damage the panel. Accordingly, the dummy common signal lines CS_LNs may be configured to be in contact with the common electrode block positioned above.

Figure 6:
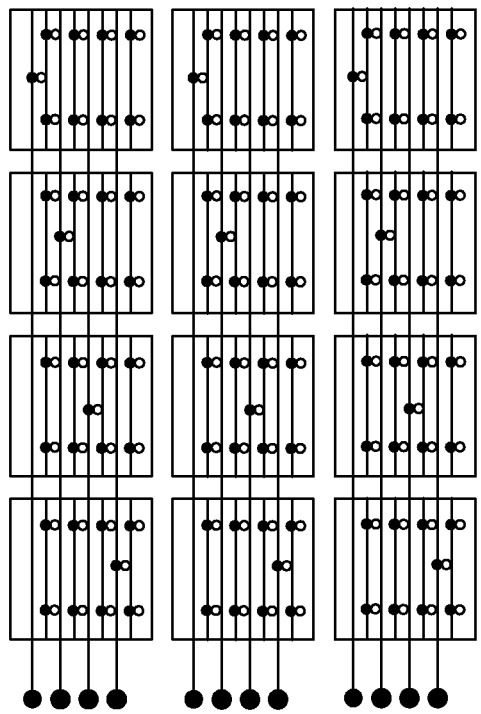
FIG. 6 is a schematic illustration showing an exemplary configuration of the common signal lines CS_LNs and the dummy common signal lines CS_LNs in the touch recognition enabled display devices according to embodiments in which the common signal lines CS_LNs are disposed under the TFTs.

FIG. 6 illustrates exemplary configurations of the dummy common signal lines CS_LNs. As shown, the dummy conductive lines do not interconnect the common electrode blocks. For instance, the dummy common signal lines CS_LNs can be formed such that they do not extend over the boundary of their respective common electrode block. The connection between the dummy common signal lines CS_LNs to the common electrode block can be made in the same way as the real common signal lines CS_LNs. In embodiments where the common signal lines CS_LNs and the dummy common signal lines CS_LNs are provided under the TFT of the panel, each dummy common signal lines CS_LNs may be in contact with the bypass line BP_LN connected to the corresponding common electrode block. Similar to the real common signal lines CS_LNs, each dummy common signal lines CS_LNs can contact the corresponding common electrode block at multiple locations by through multiple contact holes. In addition providing uniform data line capacitance in the display panel, each dummy common signal lines CS_LNs can serve as a current path within the corresponding common electrode block.

In the embodiments disclosed in the present disclosure, the common signal lines CS_LNs are arranged parallel to the data line and routed directly towards the inactive area across the active area. By routing the common signal lines CS_LNs directly across the active area, the size of the inactive area at the side of the panel can be reduced. Further, the thickness of the passivation layer between the pixel electrode PXL and the common electrode blocks can be kept minimal to increase the capacitance of the pixel. Since, the common signal lines CS_LNs can be spaced farther away from the common electrode blocks, they can be provided with a desired thickness to decrease RC delays during touch-sensing period. In addition, there is no fringe field generated between the common electrode blocks and the common signal lines CS_LNs as the common electrode blocks positioned above the common signal lines CS_LNs. This effectively solves the light leakage problem caused by having the common signal lines CS_LNs in the same layer as the pixel electrode PXL.

In the embodiments of the present disclosure, the transparent electrode and the common signal lines CS_LNs are described in reference to a touch recognition enabled LCD device. However, the use of the transparent electrode (e.g., common electrode block) and the common signal line CS_LN is not limited to displaying images from the panel and identifying the location of touch inputs. The functionalities of the transparent electrode and the common signal lines CS_LNs during other periods are not limited to activating the pixels (e.g., LCD pixel) as described above. In addition to touch-sensing functionality, the common electrode blocks and the common signal lines CS_LNs may be used in measuring amount of touch pressure on the screen, generating vibration on the screen or actuating electro-active materials in the panel.

For example, some embodiments of the display device 100 may include a layer of deformable material. The common electrode blocks may be interfaced or positioned near the deformable material, and loaded with voltage signals to measure electrical changes caused by the deformation of the deformable material. In such cases, the common electrode blocks can measure the amount of pressure on the display device 100 in addition to the location of the touch inputs. In some embodiments, the deformable material may be electro-active materials, which the amplitude and/or the frequency of the material can be controlled by electrical signals and/or electrical field. The examples of such deformable materials include piezo ceramic, electro-active-polymer and the like. In such embodiments, the common electrode blocks can be used to bend the deformable material into desired directions and/or to vibrate at desired frequencies, thereby providing tactile and/or texture feedback on the display device 100.

Furthermore, the features described in the present disclosure can also be adopted in display technologies other than LCD. For instance, features described in the present disclosure can also be in the OLED display. It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

What is claimed is:

1. A touch recognition enabled display, comprising:
   a substrate;
   a plurality of pixel groups on the substrate, each pixel group including a transparent electrode shared among a plurality of pixels of the respective pixel group;

a plurality of common signal lines at a first distance from a surface of the substrate, each common signal line connected to the transparent electrode of one of the pixel groups to transmit touch control signals between a touch drive integrated circuit and the transparent electrode;

a lower planarization layer covering the plurality of common signal lines and providing a planar surface over the plurality of common signal lines; and an array of thin-film-transistors (TFTs) provided on the lower planarization layer, the array of TFTs at a second distance from the surface of the substrate that is greater than the first distance, wherein the lower planarization layer is between at least one of the plurality of common signal lines and at least one TFT from the array of TFTs.

2. The touch recognition enabled display of claim 1, wherein the plurality of common signal lines are arranged parallel to each other in either a row direction or a column direction such that each common signal line is routed underneath one of data lines or one of gate lines.

3. The touch recognition enabled display of claim 1, wherein each of the common signal lines is routed across the transparent electrode of another the pixel group that is connected with another one of the common signal lines.

4. The touch recognition enabled display of claim 1, further comprising a plurality of bypass lines, wherein each of the common signal lines is connected to at least one of the bypass lines via a lower contact hole through the lower planarization layer, in which the bypass line is connected to the transparent electrode of one of the pixel groups via an upper contact hole through an upper planarization layer covering the array of the TFTs.

5. The touch recognition enabled display of claim 1, wherein each of the pixel groups include a plurality of bypass pixels and a plurality of normal pixels without any part of the bypass lines extending therein, in which each bypass line extends across a set of consecutively arrange bypass pixels from a first bypass pixel, which accommodates the lower contact hole, to a second bypass pixel, which accommodates the upper contact hole.

6. The touch recognition enabled display of claim 5, further comprising a masking layer having a plurality of data masking strips, each data masking strip being arranged over one of data lines, wherein at least some of the data masking strips includes one or more data masking segments that are asymmetrically arranged from other data masking segments of the same respective data masking strip.

7. The touch recognition enabled display of claim 6, further comprising a color filter layer, wherein the masking layer is provided closer to the array of the TFTs than the color filter layer.

8. The touch recognition enabled display of claim 6, wherein the data masking segments between two adjacent normal pixels have greater width than the data masking segments neighboring the first bypass pixel, the second bypass pixel or any intermediate bypass pixels between the first bypass pixel and the second bypass pixel.

9. The touch recognition enabled display of claim 6, wherein any data masking segments in each of the data masking strip neighboring the first bypass pixel, the second bypass pixel or any intermediate bypass pixels between the first bypass pixel and the second bypass pixel is narrower than other data masking segments of the respective data masking strip located between two adjacent normal pixels.

10. The touch recognition enabled display of claim 9, wherein the data masking segments between any one of the normal pixels and any one of the bypass pixels accommodating either the first contact hole or the second contact hole is asymmetrically configured such that edges of the data masking segments facing the bypass pixel accommodating the contact hole are substantially aligned with edges of the corresponding data lines facing the same direction, whereas edges of the data masking segments facing the normal pixel are extended further out toward the normal pixel than edges of the corresponding data lines facing the same direction.

11. The touch recognition enabled display of claim 6, wherein the data masking segments that are neighboring the first bypass pixel, the second bypass pixel or any intermediate pixels between the first bypass pixel and the second bypass pixel have substantially the same width, which is narrower than a width of data masking segments positioned between two adjacent normal pixels.

12. The touch recognition enabled display of claim 6, wherein each of the data masking segments neighboring the first bypass pixel or the second bypass pixel is asymmetrically configured such that a distance in which the data masking segment overhangs beyond an edge of the corresponding data line thereunder in a direction toward the first bypass pixel or the second bypass pixel is shorter than a distance that the data masking segment overhangs beyond the edge of the respective data line in the opposite direction.

13. The touch recognition enabled display of claim 6, wherein the data masking segments between the first bypass pixel and the second bypass pixel, which are immediately adjacent to each other, is symmetrically configured from a center of the data line placed thereunder such that distances in which the data masking overhangs outside edges of the data line toward both the first bypass pixel and the second bypass pixel are equal.

14. The touch recognition enabled display of claim 6, wherein the data masking segment between the first bypass pixel and an intermediate bypass pixel between the first bypass pixel and the second bypass pixel is asymmetrically configured such that a distance in which the data masking segment overhangs outside the edge of the data line thereunder toward the first bypass pixel is shorter than a distance in which the respective data masking segment overhangs outside the edge of the respective data line toward the intermediate bypass pixel.

15. The touch recognition enabled display of claim 6, wherein both the first bypass pixel and the second bypass pixel are two adjacent blue pixels of the same pixel group, and wherein at least one intermediate bypass pixel is provided between the first bypass pixel and the second bypass pixel.

16. The touch recognition enabled display of claim 1, wherein the plurality of common signal lines are formed of a first metal layer positioned below metal layers of the gate lines and the data lines, and wherein at least some of TFTs configuring the array of TFTs have a bottom gate structure such that the plurality of bypass lines and a plurality of gate lines are formed of a second metal layer above the first metal layer, and the plurality of data lines are formed of a third metal layer above the second metal layer.

17. The touch recognition enabled display of claim 16, wherein a semiconductor layer of said TFTs having the bottom gate structure is an oxide metal semiconductor layer including indium, gallium and zinc oxide.

18. The touch recognition enabled display of claim 17, wherein the lower planarization layer includes an inorganic spin on glass (SOG) layer.

19. The touch recognition enabled display of claim 18, wherein an upper surface of the SOG layer toward the array of TFTs is covered with a silicon nitride layer.

20. The touch recognition enabled display of claim 1, wherein a TFT from the array of TFTs overlaps a common signal line from the plurality of common signal lines.

* * * * *